(12) United States Patent
Yanahara et al.

(10) Patent No.: US 12,318,981 B2
(45) Date of Patent: Jun. 3, 2025

(54) CONVEYANCE APPARATUS FOR CONVEYING MOLD

(71) Applicant: Canon Virginia, Inc., Newport News, VA (US)

(72) Inventors: Yuichi Yanahara, Moriyama (JP); Hiroyuki Katagiri, Gamou (JP); Hideo Matsumoto, Moriyama (JP); Nobunari Shimoe, Moriyama (JP); Jun Tainaka, Higasiomi (JP); Mao Sato, Otsu (JP)

(73) Assignee: Canon Virginia, Inc., Newport News, VA (US)

( * ) Notice: Subject to any disclaimer, the term of this patent is extended or adjusted under 35 U.S.C. 154(b) by 283 days.

(21) Appl. No.: 17/928,910

(22) PCT Filed: May 18, 2021

(86) PCT No.: PCT/US2021/032940
§ 371 (c)(1),
(2) Date: Nov. 30, 2022

(87) PCT Pub. No.: WO2021/247234
PCT Pub. Date: Dec. 9, 2021

(65) Prior Publication Data
US 2023/0226729 A1    Jul. 20, 2023

Related U.S. Application Data

(60) Provisional application No. 63/034,150, filed on Jun. 3, 2020.

(51) Int. Cl.
B29C 45/17    (2006.01)
B29C 45/04    (2006.01)

(52) U.S. Cl.
CPC ...... B29C 45/1756 (2013.01); B29C 45/0433 (2013.01)

(58) Field of Classification Search
CPC .................. B29C 45/1756; B29C 2045/1757
See application file for complete search history.

(56) References Cited

U.S. PATENT DOCUMENTS 4,810,181 A    3/1989    Ozawa
5,451,155 A    9/1995    Kok et al.
(Continued)

FOREIGN PATENT DOCUMENTS

CN    110091466 A    8/2019
JP    6121601 B1     4/2017

*Primary Examiner* — Atul P. Khare
(74) *Attorney, Agent, or Firm* — Canon U.S.A., Inc., IP Division

(57) ABSTRACT

A conveyance apparatus for conveying a mold into an injection molding machine includes a frame configured to form a supporting plane for supporting the mold, and an actuator configured to move the mold along the supporting plane between a first position inside the injection molding machine and a second position different from the first position, wherein the improvement to the conveyance apparatus includes the actuator being located below the supporting plane in a vertical direction; and a linking unit configured to link the mold and the actuator, wherein the linking unit is connectable to a side surface of the mold, wherein, in a state where the mold is at the second position, at least a part of the actuator is closer to the injection molding machine than the side surface of the mold in a conveying direction where the actuator moves the mold.

16 Claims, 19 Drawing Sheets

(56) References Cited

U.S. PATENT DOCUMENTS

| | | | |
|---|---|---|---|
| 5,783,224 A | 7/1998 | Heinlen et al. | |
| 7,553,439 B1 | 6/2009 | Hughes et al. | |
| 10,207,428 B2* | 2/2019 | Rosan | B29C 31/047 |
| 11,104,050 B2 | 8/2021 | Nakamura | |
| 2012/0251654 A1* | 10/2012 | Schibsbye | B29C 33/26 |
| | | | 425/454 |
| 2014/0035199 A1 | 2/2014 | Kotitschke et al. | |
| 2014/0265016 A1* | 9/2014 | Nguyen | B29D 35/122 |
| | | | 425/408 |
| 2014/0299263 A1* | 10/2014 | Pozgainer | B29C 51/267 |
| | | | 156/322 |
| 2018/0009146 A1 | 1/2018 | Nakamura | |
| 2022/0402182 A1* | 12/2022 | Kodaira | B29C 45/0408 |

* cited by examiner

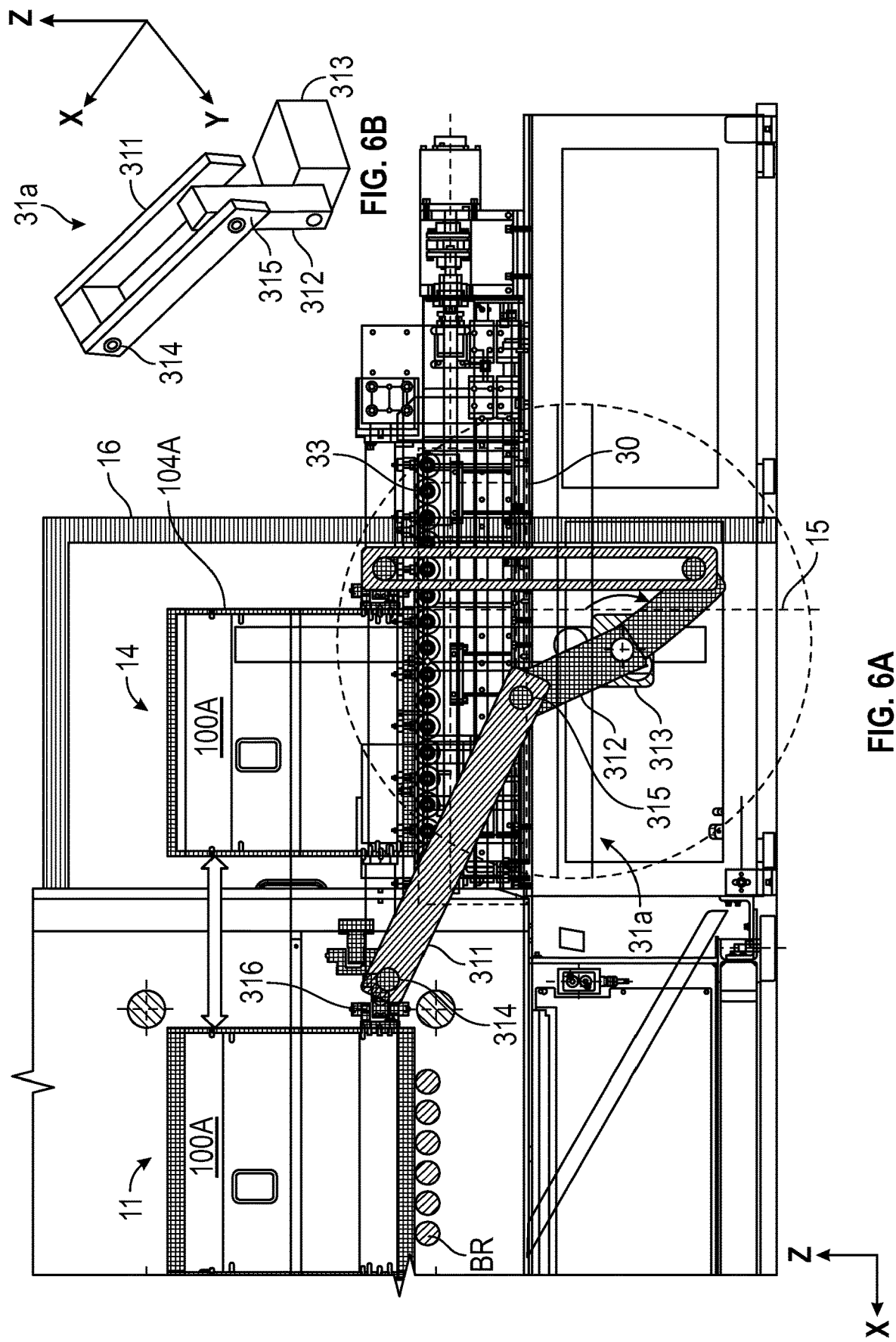

CONVEYANCE APPARATUS FOR CONVEYING MOLD

CROSS-REFERENCE TO RELATED APPLICATION

This application is a National Phase Application of PCT Application PCT/US21/32940, filed on May 18, 2021 which claims the benefit of U.S. Provisional Patent Application 63/034,150, filed Jun. 3, 2020, all of which are incorporated by reference herein in its entirety.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

In this type of molding approach, a method that uses two molds with one injection molding machine in order to enhance productivity has been proposed. For example, US 2018/0009146/Japanese patent publication No. 2018-001738/VN20160002505 are seen to discuss a system in which conveying machines 3A and 3B are arranged on both sides of an injection molding machine 2. FIG. 18 illustrates an injection molding system of US 2018/0009146/Japanese patent publication No. 2018-001738/VN20160002505. In this system, molded parts are manufactured while alternating a plurality of molds by the conveying machines 3A and 3B for the one injection molding machine 2, where an actuator for moving the molds is located next to the molds in a conveying direction of the molds. This can result in the size of the system in the conveying direction becoming large.

SUMMARY

A conveyance apparatus for conveying a mold into an injection molding machine comprising a frame configured to form a supporting plane for supporting the mold, and an actuator configured to move the mold along the supporting plane between a first position inside the injection molding machine and a second position different from the first position, wherein the improvement to the conveyance apparatus includes the actuator being located below the supporting plane in a vertical direction; and a linking unit configured to link the mold and the actuator, wherein the linking unit is connectable to a side surface of the mold, wherein, in a state where the mold is at the second position, at least a part of the actuator is closer to the injection molding machine than the side surface of the mold in a conveying direction where the actuator moves the mold.

BRIEF DESCRIPTION OF THE DRAWINGS

FIG. 6A and FIG. 6B illustrate a configuration of a conveyance unit 31a.

Figure 1:
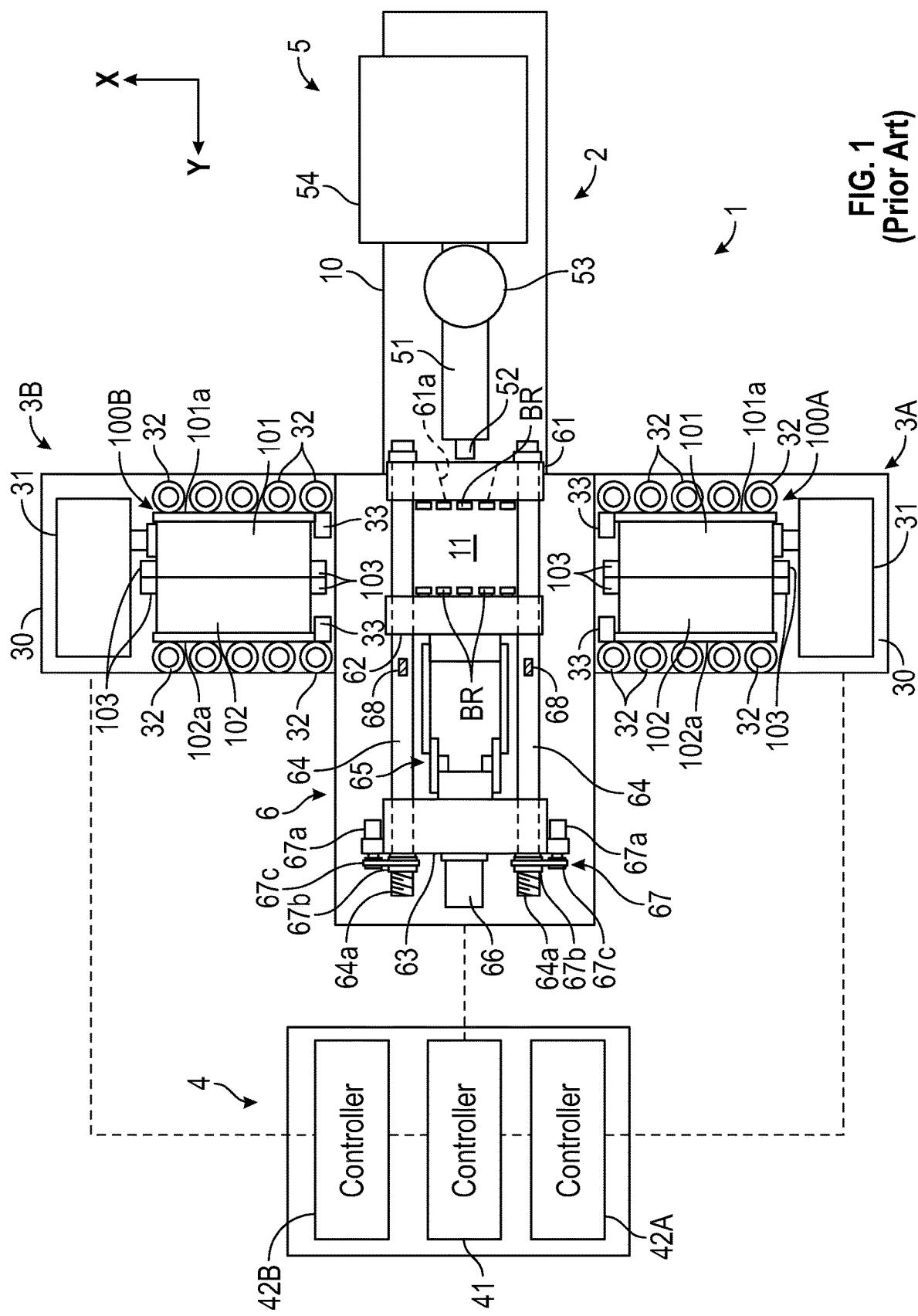
FIG. 1 illustrates an injection molding system.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, an injection molding system according to an embodiment of the present disclosure will be explained. The arrow symbols X and Y in each Figure indicate horizontal directions that are orthogonal to each other, and the arrow symbol Z indicates a vertical (upright) direction with respect to the ground.

Figure 2:
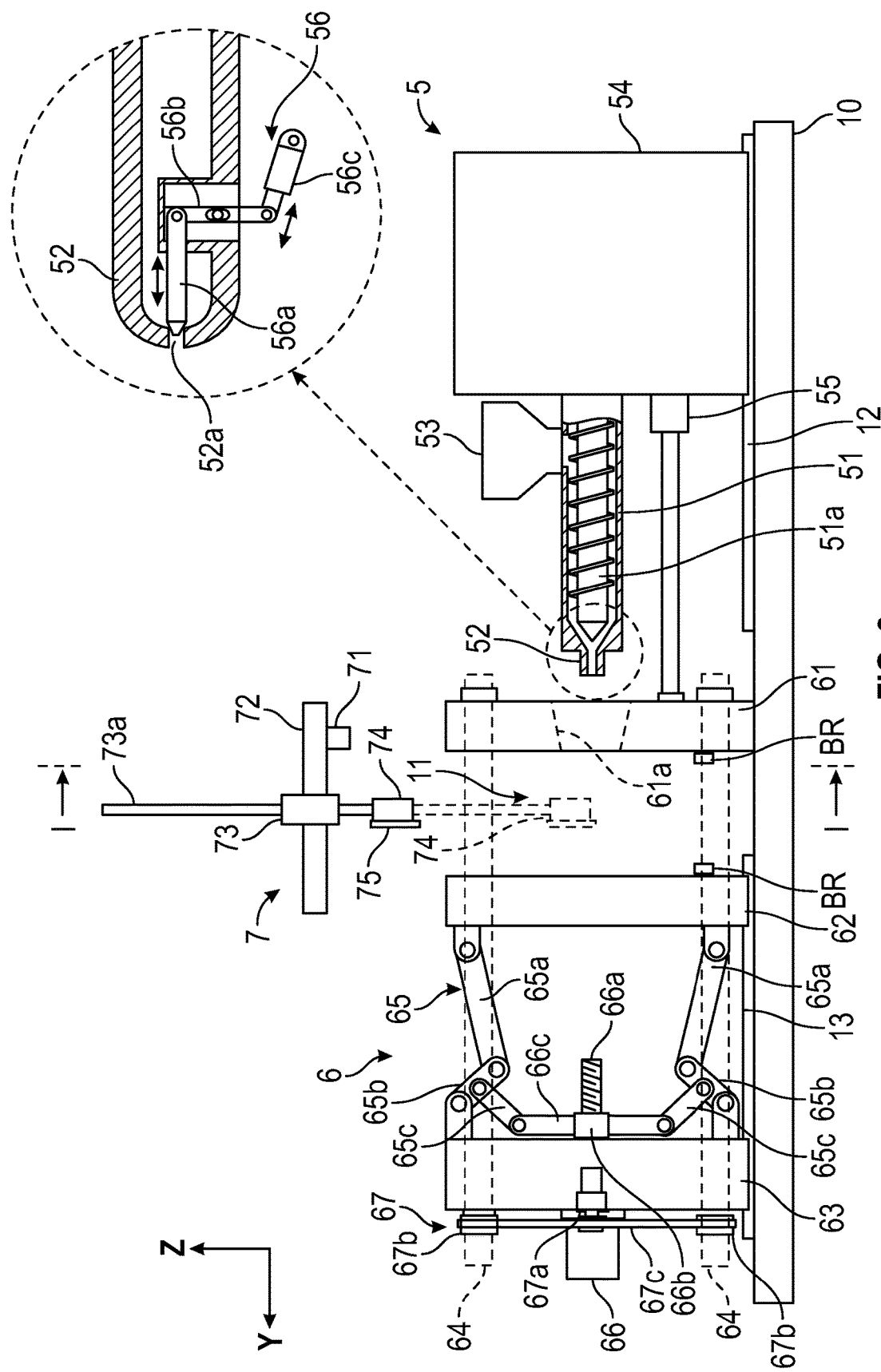
FIG. 2 is a side view of an injection molding machine.
Figure 3:
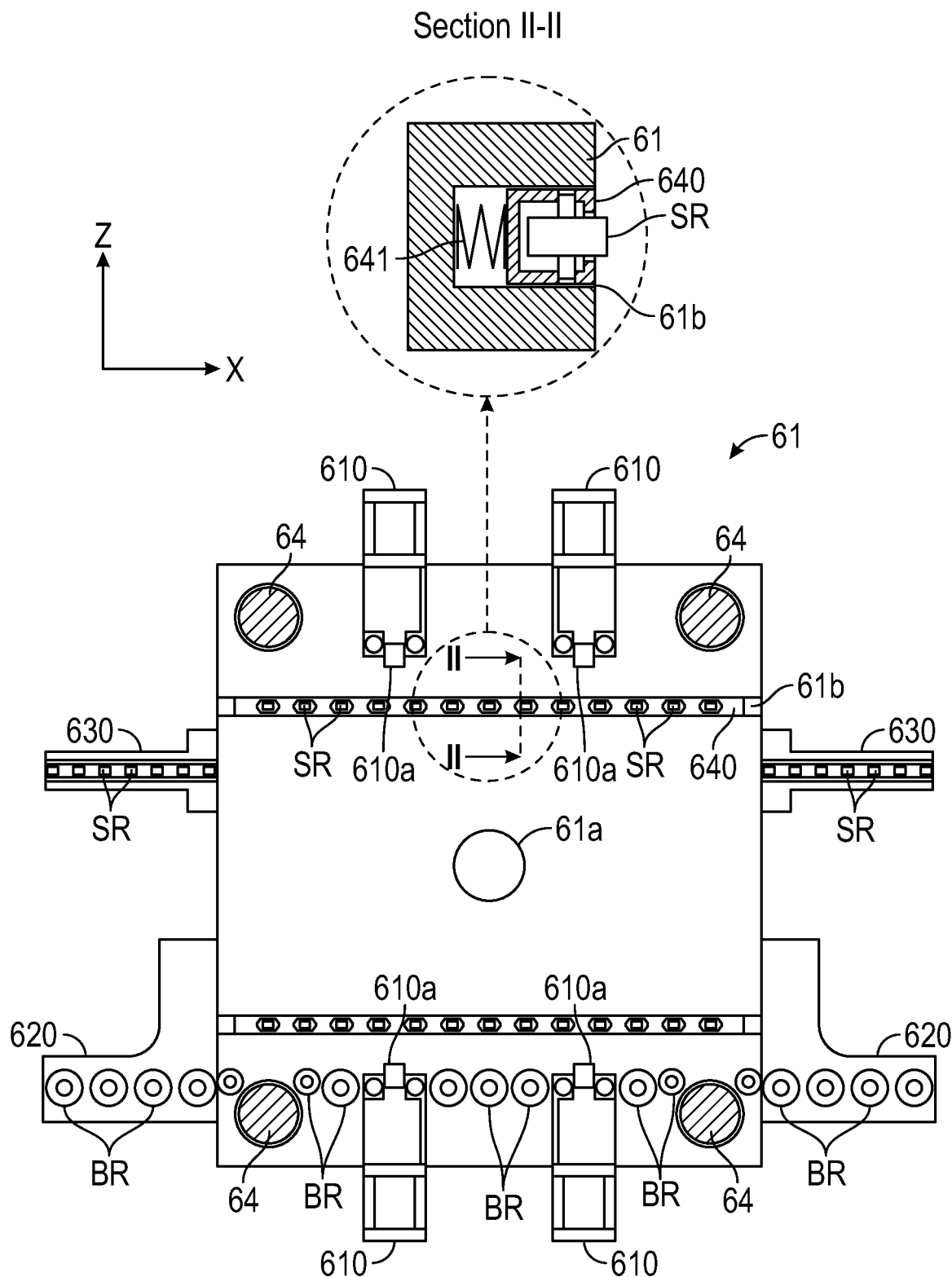
FIG. 3 is an end view of a fixed platen.

FIGS. 1-3 illustrate injection molding system 1 of US 2018/0009146/Japanese patent publication No. 2018-001738/VN20160002505 and are being provided herein for information/description purposes only.

The injection molding system 1 includes an injection molding machine 2, conveying machines 3A and 3B, and a control apparatus 4. The injection molding system 1 manufactures a molded part while alternating a plurality of molds using the conveying machines 3A and 3B for the one injection molding machine 2. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the mold 100A/100B to a molding operation position 11 (mold clamping position) of the injection molding machine.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the injection molding machine 2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in this order in the X-axis direction. In other words, the conveying machine 3A and the conveying machine 3B are arranged laterally with respect to the injection molding machine 2 to sandwich the injection molding machine 2 in the X-axis direction. The conveying machines 3A and 3B are arranged to face each other, and the conveying machine 3A is arranged on one side laterally of the injection molding machine 2, and the conveying machine 3B is arranged on the other side respectively adjacent. The molding operation position 11 is positioned between the conveying machine 3A and the conveying machine 3B. The conveying machines 3A and 3B respectively include a frame 30, a conveyance unit 31, a plurality of rollers 32, and a plurality of rollers 33.

The frame 30 is a skeleton of the conveying machine 3A and 3B, and supports the conveyance unit 31, and the pluralities of rollers 32 and 33. The conveyance unit 31 is an apparatus that moves the mold 100A/100B back and forth in the X-axis direction, and that removes and inserts the mold 100A/100B in relation to the molding operation position 11.

The conveyance unit 31 is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case in which molds cannot be conveyed simultaneously since the widths of the molds (the width in the X direction) differ or the thickness of the molds (the width in the Y direction) differ.

The plurality rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y direction, and cause movement in the X direction of the mold 100A/100B to be smooth, supporting the bottom surfaces of the mold 100A/100B (the bottom surfaces of the clamping plates 101a and 102a) and supporting the mold 100A/100B from below.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

FIG. 2 illustrates a side view of the injection molding machine 2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

With reference to FIG. 1 and FIG. 2, the injection molding machine 2 includes an injecting apparatus 5, a clamping apparatus 6, and a take-out robot 7 for ejecting a molded part. The injecting apparatus 5 and the clamping apparatus 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts a resin introduced from a hopper 53. A screw 51a is integrated into the injection cylinder 51, and by rotation of the screw 51a, plasticizing and measuring the resin introduced into the injection cylinder 51 are performed, and by movement in the axial direction (Y-axis direction) of the screw 51a, it is possible to inject a molten resin from an injection nozzle 52.

In FIG. 2, an example of a shut-off nozzle as the nozzle 52 is illustrated. For an opening/closing mechanism 56 of FIG. 2, a pin 56a for opening/closing the discharge port 52a is arranged. The pin 56a is connected with an actuator (a cylinder) 56c via a link 56b, and by the operation of the actuator 56c the discharge port 52a is opened and closed.

The injection cylinder 51 is supported by a driving unit 54. In the driving unit 54, a motor for plasticizing and measuring the resin by rotationally drive the screw 51a, and a motor for driving the screw 51a to move forward/backward in the axial direction are arranged. The driving unit 54 can move forward/backward in the Y-axis direction along a rail 12 on the frame 10, and in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The injection molding machine 2 includes sensors 68 for measuring a clamping force, where each sensor 68 is, for example, a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62.

The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620. On the inner surface of the fixed platen 61, grooves 61b that extend in the X-axis direction are formed.

The grooves 61b are formed in two rows separated vertically. On each of the grooves 61b a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/100B contacting the outer surfaces of the mold 100A/100B (the outer surface of the clamping plate 101a) and supporting the mold 100A/100B from the side. As illustrated in the cross sectional view of the line II-II, while the roller unit 640, by a bias of a spring 641, is positioned at a position at which the roller SR protrudes from the groove 61b, at a time of clamping it is retracted in the groove 61b, and positioned at a position at which the roller SR does not protrude from the groove 61b. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping. On both sides in the X-axis direction of the fixed platen 61, a roller supporting body 630 is fixed, and a plurality of rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610a that engages with the clamping plate 101a, and a built-in actuator (not illustrated) that moves the engaging portion 610a between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

Figure 4A:
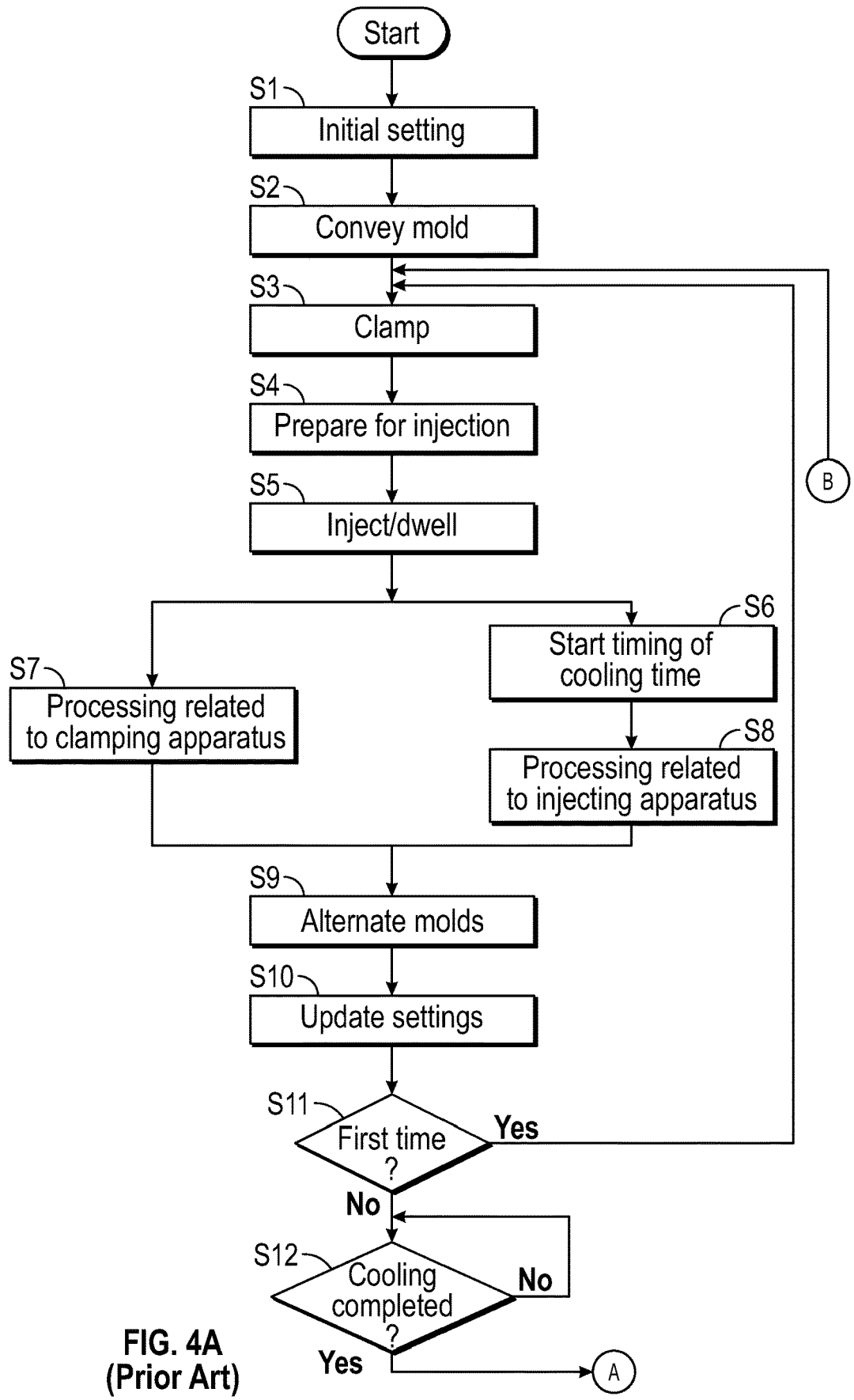
FIG. 4A illustrates a flowchart illustrating a molding process.

FIG. 4A illustrates an example of a known operation of the injection molding system 1 executed by the controller 41. In the following example, a case in which a molding operation is performed while alternating molds 100A and 100B.

An initial setting is performed in step S1. The operation conditions of the injecting apparatus 5 and the clamping apparatus 6 are registered for both molds 100A and 100B. The operation conditions include, but are not limited to, the amount of resin that is injected at one time, the temperature, the injection speed, the clamping force, the initial value of the position of the movable platen 63 in relation to the tie-bars 64, etc. These operation conditions differ even when the mold 100A and the mold 100B are the same type of mold. Because the mold 100A is used for a first molding operation, the operations conditions related to the mold 100A are automatically set as the operation conditions. Heating of the injection cylinder 51 and plasticizing and measuring of the resin and the like for the first time is also started.

In step S2, the mold 100A is conveyed into the injection molding machine 2. The motor 66 is driven to widen the gap between the fixed platen 61 and the movable platen 62 to slightly wider than the thickness of the mold 100A (the width in the Y direction). Next, the controller 41 transmits an instruction to load the mold 100A to the controller 42A, and the controller 42A drives the conveyance unit 31 to load the mold 100A into the molding operation position 11. A linking unit 200 is used to unload the mold 100A and load the mold 100B at the same time. When loading of the mold 100A completes, a signal indicating load completion is transmitted from the controller 42A to the controller 41. When the signal indicating load completion is received, the motor 66 is driven to bring the fixed platen 61 and the movable platen 62 into close contact with the mold 100A. At this time it is not necessary to generate a clamping force as it is generated to occur during a molding. The mold 100A is locked to each of the fixed platen 61 and the movable platen 62 by driving the fixing mechanisms 610.

In step S3, clamping of the mold 100A by the fixed platen 61 and the movable platen 62 is performed by driving the motor 66 to drive the toggle mechanism 65. Preparation for injection in relation to the mold 100A is performed. The actuator 55 is driven to move the injecting apparatus 5, causing the nozzle 52 to contact the mold 100A.

In step S5, injection and dwelling of molten resin is performed. More specifically, the injecting apparatus 5 is driven to fill molten resin into a cavity in the mold 100A from the nozzle 52, and to press the resin in the cylinder 51 into the mold 100A at a high pressure in order to compensate for a volume decrease due to the resin solidifying. The actual clamping force is measured by the sensor 68. During molding, the mold 100A thermally expands due to the temperature of the mold 100A gradually rising, and there are cases where a difference arises in the initial clamping force and the clamping force after some time has passed. Thus, it is possible to correct the clamping force at the time of the next clamping based on a result of measurement by the sensors 68.

The adjustment of the clamping force is performed by an adjustment of the position of the movable platen 63 in relation to the tie-bar 64 by driving the motor 67. This enables enhancing precision of the clamping force by adjusting the clamping force by correcting the initial value of the position of the movable platen 63 in relation to the tie-bars 64 based on the result of measurement by the sensors 68. The adjustment of the position of the movable platen 63 in relation to the tie-bars 64 can be performed at any timing, e.g., at the timing of steps S7 and S9 in FIG. 4A and steps S13-step S15 in FIG. 4B.

Figure 7:
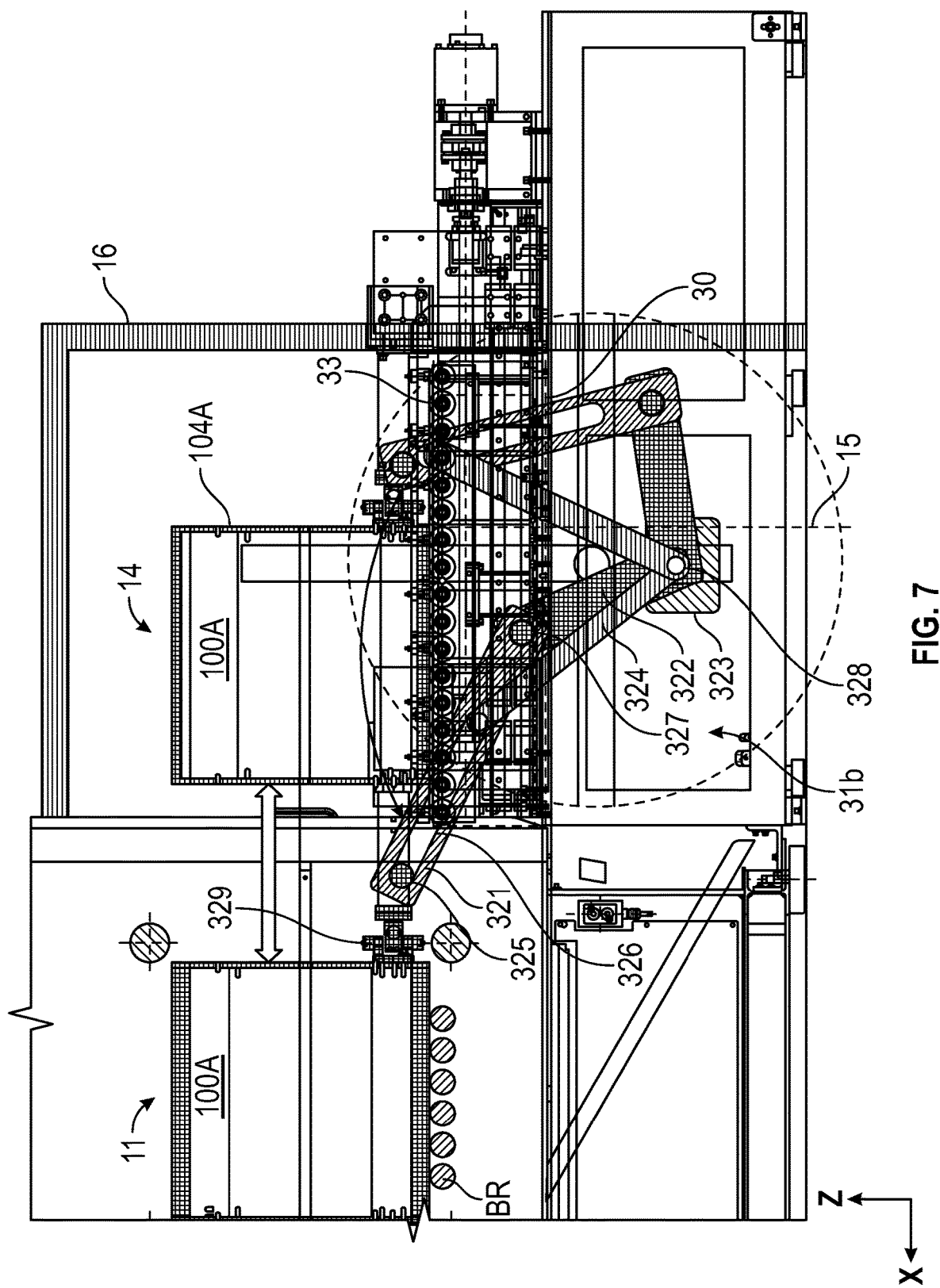
FIG. 7 illustrates a configuration of a conveyance unit 31b.

The processing of step S6 and step S8 is performed in parallel to step S7. In step S6, the timing of the cooling time for the molded part in the mold 100A is started. In step S7, processing related to the clamping apparatus 6 is performed. More specifically, locking of the mold 100A by the fixing mechanism 610 is released. After a delay of a predetermined time from step S5, the motor 66 is driven to drive the toggle mechanism 65. This results in removal of the clamping force, the movable platen 62 separates slightly in relation to the fixed platen 61, and a space facilitating alternating the molds is formed. The state ST4 illustrated in FIG. 7 is a state where the movable platen 62 separates slightly in relation to the fixed platen 61.

In step S8, processing related to the injecting apparatus 5 is performed. For example, a dwelling suck back, a nozzle shut-off, a retraction of the injecting apparatus 5 or the like are performed. The state ST4 of FIG. 7 illustrates a state in which the injecting apparatus 5 is retracted (a state in which the nozzle 52 is retracted). The dwelling suck back and the nozzle shut-off prevent the molten resin from dripping when the nozzle 52 separates from the mold 100A. These processes can be performed during a delay time prior to causing the movable platen 62 to separate slightly in relation to the fixed platen 61 in step S7.

The dwelling suck back reduces the resin pressure in the injection cylinder 51 and in the molds 100A/100B when, after the dwelling, the screw 51a is retracted. The position to which the screw 51a is retracted in the dwelling suck back can be managed as an absolute position, and can be managed as a relative position in relation to a position of the screw 51a after dwelling completion. The screw 51a can be caused to retract until it is detected that the resin pressure measured by a load cell (not illustrated) installed in the injecting apparatus 5 is reduced to a predetermined pressure.

The nozzle shut-off closes the discharge port 52a of the nozzle 52, and in the example of FIG. 2, the pin 56a closes the discharge port 52a. This operation enables suppressing the leaking of resin. The precision of the measuring of the resin can be improved for the next injection. The foregoing processing provides to prevent the resin from leaking, but there are cases where long threadlike resin is generated between the mold 100A/100B and the nozzle 52 due to the structure of the mold 100A/100B or the type of resin. An apparatus for injecting air into the nozzle 52 can be installed to prevent this from occurring.

In step S9, alternation of the molds 100A/100B is performed. The mold 100A is unloaded from the molding operation position 11 to the conveying machine 3A, and the mold 100B is loaded from the conveying device 3B to the molding operation position 11. The controller 41 transmits an instruction to unload the mold 100A to the controller 42A, and the controller 42A drives the conveyance unit 31 to unload the mold 100A from the molding operation position 11. The linking unit 200 enables unloading the mold 100A and loading of the mold 100B to be performed at the same time. When unloading of the mold 100A completes, a signal indicating unloading completion is transmitted from the controller 42A to the controller 41. The mold 100A is cooled on the conveying machine 3A. At this time, the closed state of the mold 100A is maintained due to the operation of the self-closing unit 103.

When the signal indicating unloading completion is received, the operation conditions for the mold 100B are set as the operation conditions of the molding operation in step S10. For example, the thickness of the mold 100B (the width of the Y direction), the clamping force and the like are set as the operation conditions of the molding operation. Molding conditions such as injection speed, etc. corresponding to the mold 100B are also set. Measurement of plasticization for the next injection is started. The motor 66 is driven to cause the fixed platen 61 and the movable platen 62 to closely contact the mold 100B. At this time, it is not necessary to cause a clamping force as is caused to occur during molding to occur. The mold 100B is locked to both the fixed platen 61 and the movable platen 62 by driving the fixing mechanism 610.

After step S9 in the present embodiment, step S10 is performed. However, since it can take time to switch the molding operation conditions, the molding operation conditions can, for example, be switched simultaneously to the instruction to unload the mold 100A.

In step S11, it is determined whether the molding operation is the first molding operation in relation to the molds 100A and 100B. If the molding operation is the first molding operation, the process returns to step S3. If the molding operation is not the first molding operation, i.e., a second, third, etc. molding operation, the process proceeds to step S12.

The above-described process described a first molding operation. As such, the process returns to step S3. The processing of step S3 to step S8 is then executed for the mold 100B.

After the processing of step S3 to step S8 is executed for the mold 100B, the mold 100B is unloaded in step S9, and loading of the mold 100A is performed. The mold 100B is cooled on the conveying device 3B. In step S11, it is determined that the molding operation is not the first molding operation, and the process proceeds to step S12.

Figure 4B:
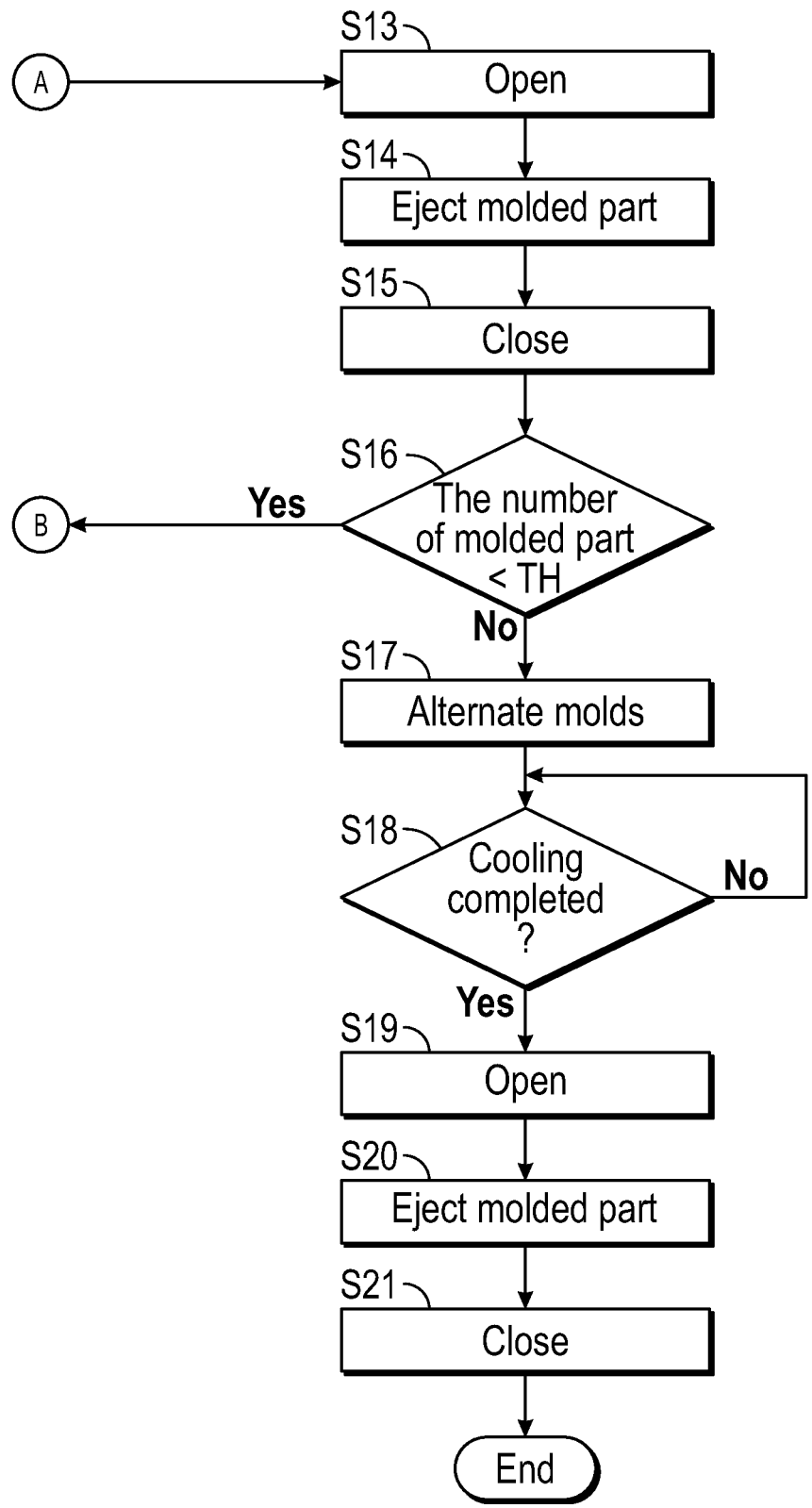
FIG. 4B illustrates an improvement to the molding process in FIG. 4A.

In step S12, it is determined whether the cooling of the mold 100A has been completed based on whether the cooling time from the start of the time measurement in step S6 has reached a predetermined time. If cooling has been completed, the processing of step S13 to step S16 in FIG. 4B is performed.

In step S13, the movable platen 62 is separated from the fixed platen 61 by driving the motor 66. The fixed mold 101 is fixed to the fixed platen 61 by the fixing mechanisms 610, while the movable mold 102 is fixed to the movable platen 62 by the fixing mechanisms 610. Therefore, the movable mold 102 separates from the fixed mold 101 and the mold 100A is opened against a force of the self-closing unit 103. In step S14, the molded part remaining on the side of the movable mold 102 of the mold 100A is removed by driving the take-out robot 7, and conveyed out of the injection molding machine 2. The vacuum head 74 is moved to a position where the chuck plate 75 faces the molded par, and the molded part is secured by a suction force.

In step S15, the movable platen 62 is brought close to the fixed platen 61 by driving the motor 66. The movable mold 102, which was previously separated from the fixed mold 101, closely contacts with the fixed mold 101, and the mold 100A is closed. When the injection molding operation is using mold 100B, steps S13, S14, and S15 are executed to remove molded parts from the mold 100B.

In step S16, the controller 41 compares the number of currently produced molded parts and a threshold value TH. The number of currently produced molded parts is stored in ROM and/or RAM. The threshold value TH is the desired production quantity and is set in step S1. If the number of currently molded parts is less than the threshold value TH, the flow returns to step S3. At that point, the above processing repeats.

If the number of currently molded parts equals the threshold value TH, the flow proceeds to step S17. The processing in steps S17 to S21 is for removing the molded parts from the other mold, e.g., mold 100B.

In step S17, the molds 100A/100B are alternated in the same manner described in step S9. In the present step, the mold 100A is unloaded from the molding operation position 11 to the conveying machine 3A, while the mold 100B is loaded from the conveying device 3B to the molding operation position 11. The controller 41 transmits an instruction to unload the mold 100A to the controller 42A, and the controller 42A drives the conveyance unit 31 to unload the mold 100A from the molding operation position 11. The linking unit 200 enables unloading of the mold 100A and loading of the mold 100B to be performed at the same time. When unloading of the mold 100A completes, a signal indicating unloading completion is transmitted from the controller 42A to the controller 41.

After receipt of the signal indicating unloading completion, in step S18, it is determined whether cooling of the mold 100B has been completed based on whether the cooling time started in step S6 has reached a predetermined time. If the cooling has completed, the process proceeds to step S19.

In step S19, the movable platen 62 is separated from the fixed platen 61 by driving the motor 66. The fixed mold 101 is fixed to the fixed platen 61 by the fixing mechanisms 610, while the movable mold 102 is fixed to the movable platen 62 by the fixing mechanisms 610. The movable mold 102 separates from the fixed mold 101, and the mold 100A is opened against the force of the self-closing unit 103. The molded part remaining on the side of the movable mold 102 of the mold 100A is removed by driving the take-out robot 7 in step S20, and conveyed outside the injection molding machine 2. The vacuum head 74 is moved to a position where the chuck plate 75 faces the molded part and the molded part is secured held by a suction force. In step S21, the movable platen 62 is brought close to the fixed platen 61 by driving the motor 66. The movable mold 102, which was previously separated from the fixed mold 101, closely contacts with the fixed mold 101, and the mold 100A is closed. When the injection molding operation is using mold 100B, steps S19, S20, and S21 are executed to remove molded parts from the mold 100B.

As described above, in the present embodiment, cooling of the molds 100A and 100B is performed on the conveying machines 3A and 3B outside the injection molding machine 2. During cooling of one of the molds 100A and 100B, each process of molded part removal, mold clamping, injection and dwelling is performed by the injection molding machine 2 for the other mold 100A/100B. Since opening and molded part removal are performed by the injection molding machine 2, the conveying machines 3A and 3B do not need to have functions for opening and molded part removal. Thus, it is possible to manufacture a molded part while alternating the molds 100A and 100B with the one injection molding machine 2 while suppressing cost increase of the injection molding system.

If the time required for all processes from the start of the mold replacement process, to the removal process for the other mold, injection process, and dwelling process, and up until completion of the mold replacement process once again fits into the time required for cooling one of the molds 100A or 100B, then productivity compared to normal molding is improved by at least two times. That is, in addition to suppressing cost increases, higher productivity can be achieved.

In order to realize twice the level of productivity, it is sufficient that the cooling time of the molds 100A and 100B cover 50% or more of the total molding process (the time for one molding cycle), but this depends on the time for the mold replacement process. Many molded parts used for exterior covering parts or electromechanical parts, such as for automobiles, home electric appliances, office devices or the like, have a thickness of several millimeters to ensure strength. Thus, during the total molding process, the cooling process covers the longest time, and it is not uncommon for the time to cool the molds 100A and 100B to reach from 50% to 70% in relation to the time for one molding cycle. Therefore, the above-described embodiment is particularly effective in improving productivity of this type of molded part. The productivity can be particularly improved if the time for the molding cycle of the mold 100A and the time for the molding cycle of the mold 100B are approximately the same, while the time for cooling the molds 100A and 100B in relation to the time for one molding cycle is greater than or equal to 50%.

Even if the thickness of the molded part is approximately 1 mm and is comparatively thin, there is a tendency for the cooling process to become longer in cases of parts for which high dimensional precision is required, for molded parts that use a resin for which a high temperature is required as a mold temperature, or for a crystalline resin where cooling is time consuming. In the above-described embodiment, it is possible to realize close to two times the productivity when manufacturing a wide variety of molded parts.

If the time to cool the molds 100A and 100B is less than 50% of the time for one molding cycle, effective application of the time for cooling enables the realization of 1.5 times or 1.8 times higher productivity in relation to normal molding.

Based on the above-described embodiment, the installation space and the power consumption can be reduced due to achieving the productivity of two injection molding machines by the conventional manufacturing method in the one injection molding machine 2.

FIGS. 5A-17C illustrate improvements provided by the present disclosure over current injection molding systems. Components of known injection molding systems are included in the description of FIGS. 5A-17C for description purposes only. The following discussion of FIGS. 5A-17C will be provided with respect to the mold A for description purposes only.

Figure 5B:
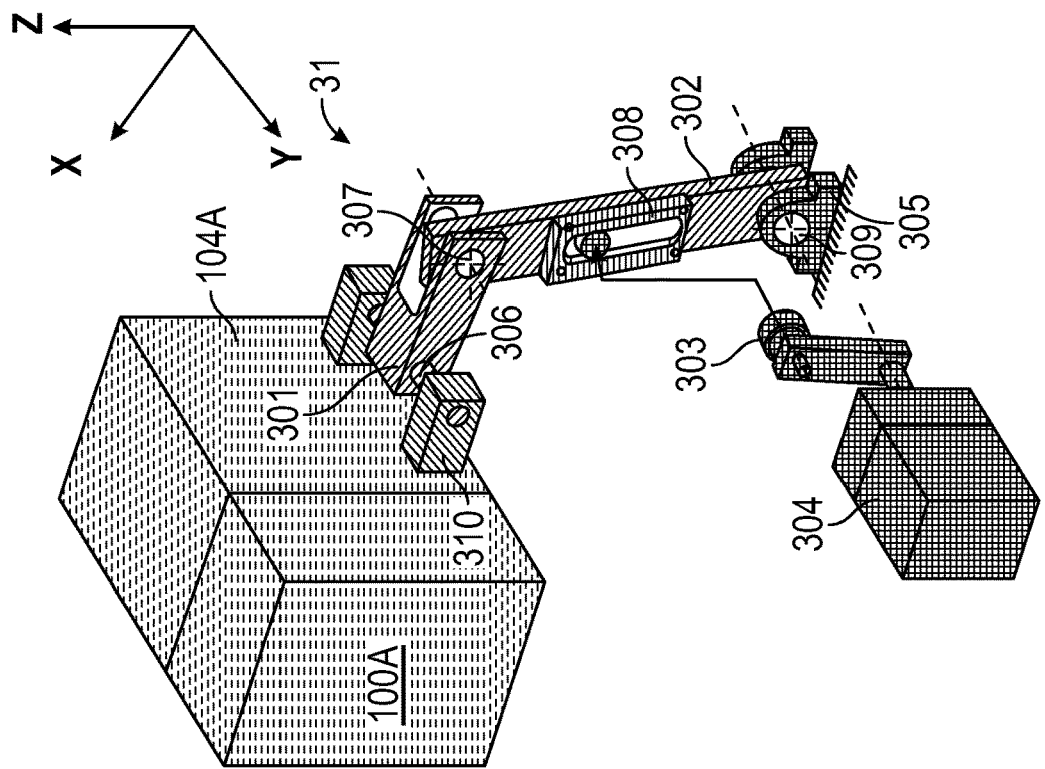
FIG. 5A and FIG. 5B illustrate a configuration of a conveyance unit 31.
Figure 5A:
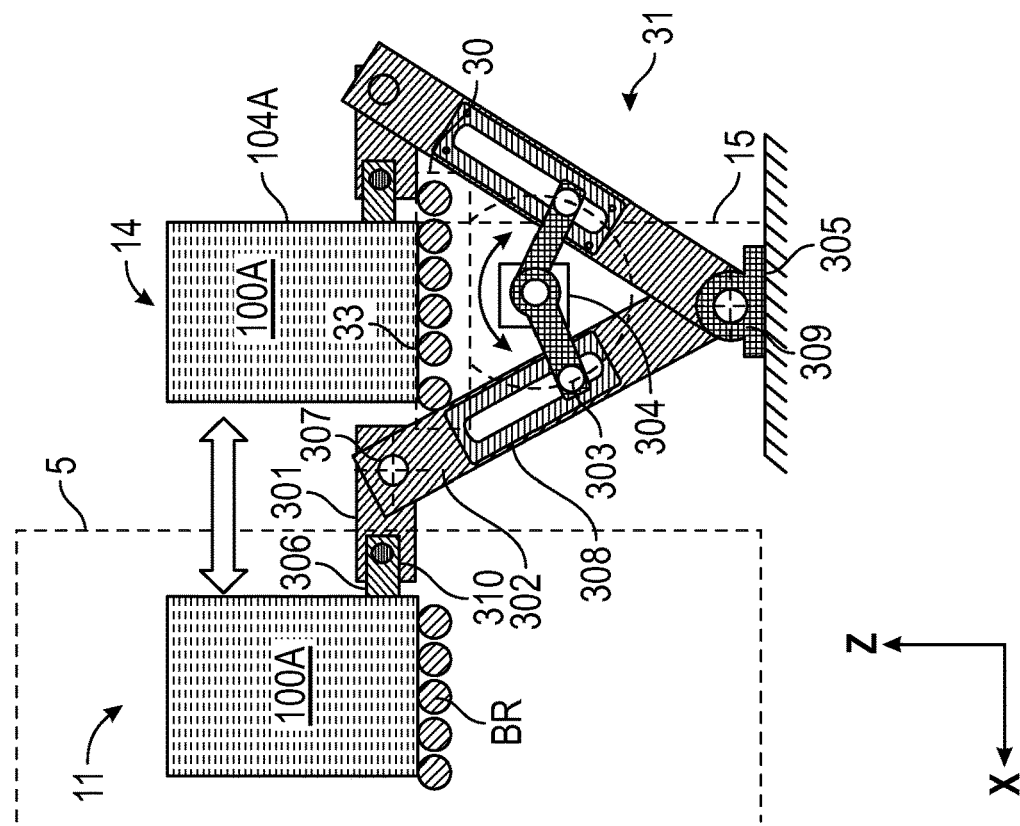

FIGS. 5A and 5B illustrates a configuration of the conveyance unit 31. FIG. 5A illustrates a side view of the conveyance unit 31 while FIG. 5B illustrates a perspective view of the conveyance unit 31.

In FIG. 5A, the conveyance unit 31 includes a first linking member 301, a second linking member 302, a lever 303, a motor 304, e.g. actuator, and a supporting member 305. A linking block 310 is attached to the side surface 104A of the mold 100A. The linking block 310 also supports a shaft 306 that extends in the Y-axis direction. The first linking member 301 is connected to the side surface 104A of the mold 100A via the shaft 306. The first linking member 301 is rotatable around the shaft 306.

In order to manage vibrations, etc., during conveyance, the first linking member 301 can be movable in parallel with the linking block 310 in the Y-axis direction together with the shaft 310. The first linking member 301 and the 2nd linking member 302 are connected via the shaft 307 extending in the Y-axis direction. The first linking member 301 and the second linking member 302 are mutually rotatable around the shaft 307. The second linking member 302 is connected to the supporting member 305 via a shaft 309 extending in the Y-axis direction.

The supporting member 305 supports both ends of the shaft 309 in the Y-axis direction. The second linking member 302 is rotatable around the shaft 309. The lever 303 rotates in the direction of the arrow when receiving the driving force of the motor 304. A cam follower, i.e., a protrusion portion, installed on the end of the lever 303 engages with a slotted hole 308 formed in the second linking member 302 as illustrated in FIG. 5B. Except for the motor 304, the above-described components can be collectively referred to as a linking unit.

The mold 100A moves between the molding operation position 11 inside the injection molding machine 5 and the cooling position 14 that differs from the molding operation position 11 upon receiving actions of the first linking member 301, the second linking member 302, the lever 303 and the motor 304.

The rollers 33 contact the bottom surfaces of both ends in the Y-axis direction of the mold 100A to guide the movement of the mold 100A. The frame 30 to which the rollers 33 are attached forms a supporting surface of the mold 100A. The supporting surface of the mold 100A is the top surface of the frame 30. The motor 304 is positioned below the supporting surface in the Z-axis direction (vertical direction). A hole is formed in the central portion of the frame 30 in the Y-axis direction for the linking unit connecting the motor 304 and the side surface 104A of the mold 100A. The position of the side surface 104A in the condition where the mold 100A is at the cooling position 14 is indicated by the dotted line 15.

The motor 304 is located at a position closer to the injection molding machine 5 than the dotted line 15 in the X-axis direction (direction of mold movement). All portions of the motor 304 are located closer to the injection molding machine 5 than the dotted line 15 in FIG. 5A. However, at least a portion of the motor 304 can be located in a position closer to the injection molding machine 5 than the dotted line 15.

The operation of the conveying unit 31 will now be described. When the mold 100A is conveyed from the cooling position 14 toward the molding operation position 11, the motor 304 rotates in the counterclockwise direction in FIG. 5A. The lever 303 that is connected to the motor 304 also rotates in the counterclockwise direction, and the cam follower moves by sliding through the slotted hole 308 of the second linking member 302. The second linking member 302 rotates counterclockwise around the shaft 309 under the influence of the driving force received via the slotted hole 308.

Along with rotational motion of the second linking member 302, the first linking member 301 that is connected to the second linking member 302 pushes out the mold 100A via the shaft 306. Thus, the mold 100A is moved from the cooling position 14 to the molding operation position 11. When conveying the mold 100A from the molding operation position 11 toward the cooling position 14, the motor 304 reversely rotates in the clockwise direction as in FIG. 5A. The other components of the conveyance unit 31 operate in a direction opposite to the above-described direction, and the mold 100A is moved from the molding operation position 11 to the cooling position 14.

Using a configuration such as the above-described configuration, it is possible to downsize the injection molding system in the X-axis direction compared to a conventional injection molding system. In addition to the downsizing of the injection molding system, the length of the frame 30, etc., is shortened, so that the material cost for each component can be reduced.

FIGS. 6A and 6B illustrate the configuration of the conveying unit 31a in a first modification. The conveying unit 31a illustrated in FIGS. 6A and 6B can be used instead of the conveying unit 31 illustrated in FIGS. 5A and 5B. FIG. 6A illustrates a side view of the conveying unit 31a, while FIG. 6B illustrates a perspective view of the conveying unit 31a.

In FIG. 6A, the conveyance unit 31a includes a first linking member 311, a second linking member 312, and a motor 313, e.g., actuator. The linking block 316 is attached to the side surface 104A of the mold 100A, and the linking block 316 supports the shaft 314 extending in the Y-axis direction. The first linking member 311 is connected to a side face 104A of the mold 100A via the shaft 314. The first linking member 311 is rotatable around the shaft 314.

In order to manage with vibration(s), etc., during conveyance, the first linking member 311 can be movable in parallel with the linking block 316 in the Y-axis direction together with the shaft 314. The first linking member 311 and the second linking member 312 are connected via the shaft 315 extending in the Y-axis direction. The first linking member 311 and the second linking member 312 are mutually rotatable around the shaft 315. The second linking member 312 rotates in the direction of the arrow upon receiving the driving force of the motor 313. Except for the motor 313, the above-mentioned components can be collectively referred to as a linking unit. In FIG. 6A, a cover 16 is installed to cover the mold 100A from the outside. The cover 16 can also be added to the configuration illustrated in FIGS. 5A and 5B.

The mold 100A moves between the molding operation position 11 inside the injection molding machine 5 and the cooling position 14 that differs from the molding operation position 11 upon receipt of the actions of the first linking member 311, the second linking member 312 and the motor 313. The rollers 33 contact the bottom surfaces of both ends of the mold 100A in the Y-axis direction to guide the movement of the mold 100A. The frame 30, to which the rollers 33 are attached, form the supporting surface of the mold 100A. The supporting surface of the mold 100A is the top surface of the frame 30.

The motor 313 is positioned below the support surface in the Z-axis direction (vertical direction). A hole is formed in the central portion of the frame 30 in the Y-axis direction for the linking unit connecting the motor 313 and the side surface 104A of the mold 100A. The position of the side surface 104A where the mold 100A is at the cooling position 14 is indicated by the dotted line 15. The motor 313 is installed closer to the injection molding machine 5 than the dotted line 15 in the X-axis direction (direction of mold movement). All portions of the motor 313 are located closer to the injection molding machine 5 than the dotted line 15 in FIG. 6A. At least a portion of the motor 313 can be located closer to the injection molding machine 5 than the dotted line 15.

The operation of the conveyance unit 31a will now be described. When the mold 100A is conveyed from the cooling position 14 toward the molding operation position 11, the motor 313 rotates in the counterclockwise direction as illustrated in FIG. 6A. The second linking member 312 connected to the motor 313 also rotates in the counterclockwise direction. Along with the rotating motion of the second connecting member 312, the first linking member 311 connected to the second linking member 312 pushes out the mold 100A via the shaft 314. As a result, the mold 100A is moved from the cooling position 14 to the molding operation position 11. When the mold 100A is conveyed from the molding operation position 11 to the cooling position 14, the motor 313 rotates in the clockwise direction illustrated in FIG. 6A. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc., is shortened so the material cost for each component can also be reduced.

FIG. 7 illustrates a side view of the structure of the conveyance unit 31b in a second modification. The conveyance unit 31b illustrated in FIG. 7 can be used in place of the conveyance unit 31 illustrated in FIGS. 5A and 5B.

The conveyance unit 31b in FIG. 7 includes a first linking member 321, a second linking member 322, a motor 323, e.g., actuator, and a lever 324. A linking block 329 is attached to the side surface 104A of the mold 100A, and the linking block 329 supports the shaft 325 extending in the Y-axis direction.

The first linking member 321 is connected to the side surface 104A of the mold 100A via the shaft 325. The first linking member 321 is rotatable around the shaft 325. To manage vibration(s), etc., during conveyance, the first linking member 321 can be movable in parallel with the linking block 329 in the Y-axis direction together with the shaft 325. The first linking member 321 and the second linking member 322 are connected via the shaft 327 extending in the Y-axis direction. The first linking member 321 and the second linking member 322 are mutually rotatable around the shaft 327.

The second linking member 322 rotates in the direction of the arrow upon receipt of the driving force of the motor 323. The lever 324 is not connected to the motor 323, but can rotate around the shaft 328 that extends in the Y-axis direction. A slotted hole 326 is formed in the first linking member 321, and a cam follower installed at the tip of the lever 324 engages with the slotted hole 326. The described configuration is the same as the relationship between the lever 303 and the slotted hole 308 illustrated in FIG. 5B. Except for the motor 323, the above-described components can be collectively referred to as a linking unit. A cover 16 is installed to cover the mold 100A from the exterior. The mold 100A moves between the molding operation position 31 inside the injection molding machine 5 and the cooling position 14, which is different from the molding operation position 11, upon receipt of the actions of the first linking member 321, the second linking member 322, the motor 323, and the lever 324.

The rollers 33 contact the bottom surfaces of both ends in the Y-axis direction of the mold 100A to guide the movement of the mold 100A. The frame 30 to which the rollers 33 are attached forms a supporting surface of the mold 100A. The supporting surface of the mold 100A is the top surface of the frame 30. The motor 323 is positioned below the support surface in the Z-axis direction (vertical direction). A hole is formed in the central portion of the frame 30 in the Y-axis direction for the linking unit that connects the motor 323 and the side surface 104A of the mold 100A. The position of the side surface 104A where the mold 100A is at the cooling position 14 is indicated by the dotted line 15. The motor 323 is installed closer to the injection molding machine 5 than the dotted line 15 in the X-axis direction (direction of mold movement). All the positions of the motor 323 are located closer to the injection molding machine 5 than the dotted line 15 in FIG. 7. However, at least a part of the motor 323 can be located closer to the injection molding machine 5 than the dotted line 15.

The operation of the conveyance unit 31b will now be described. When the mold 100A is conveyed from the cooling position 14 toward the molding operation position 11, the motor 323 rotates in the counterclockwise direction illustrated in in FIG. 7. The second linking member 322 that is connected to the motor 323 also rotates in the counterclockwise direction. Along with the rotational motion of the second linking member 322, the first linking member 321, which is connected to the second linking member 322, pushes out the mold 100A via the shaft 325. The lever 324 serves to guide the first linking member 321 so that the transmission of the driving force from the second linking member 322 to the first linking member 321 is performed smoothly. As a result, the mold 100A is moved from the cooling position 14 to the molding operation position 11. When the mold 100A is conveyed from the molding operation position 11 towards the cooling position 14, the motor 323 reversely rotates in a clockwise direction as illustrated in in FIG. 7. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc. is shortened, so the material cost for each component can also be reduced.

Figure 8:
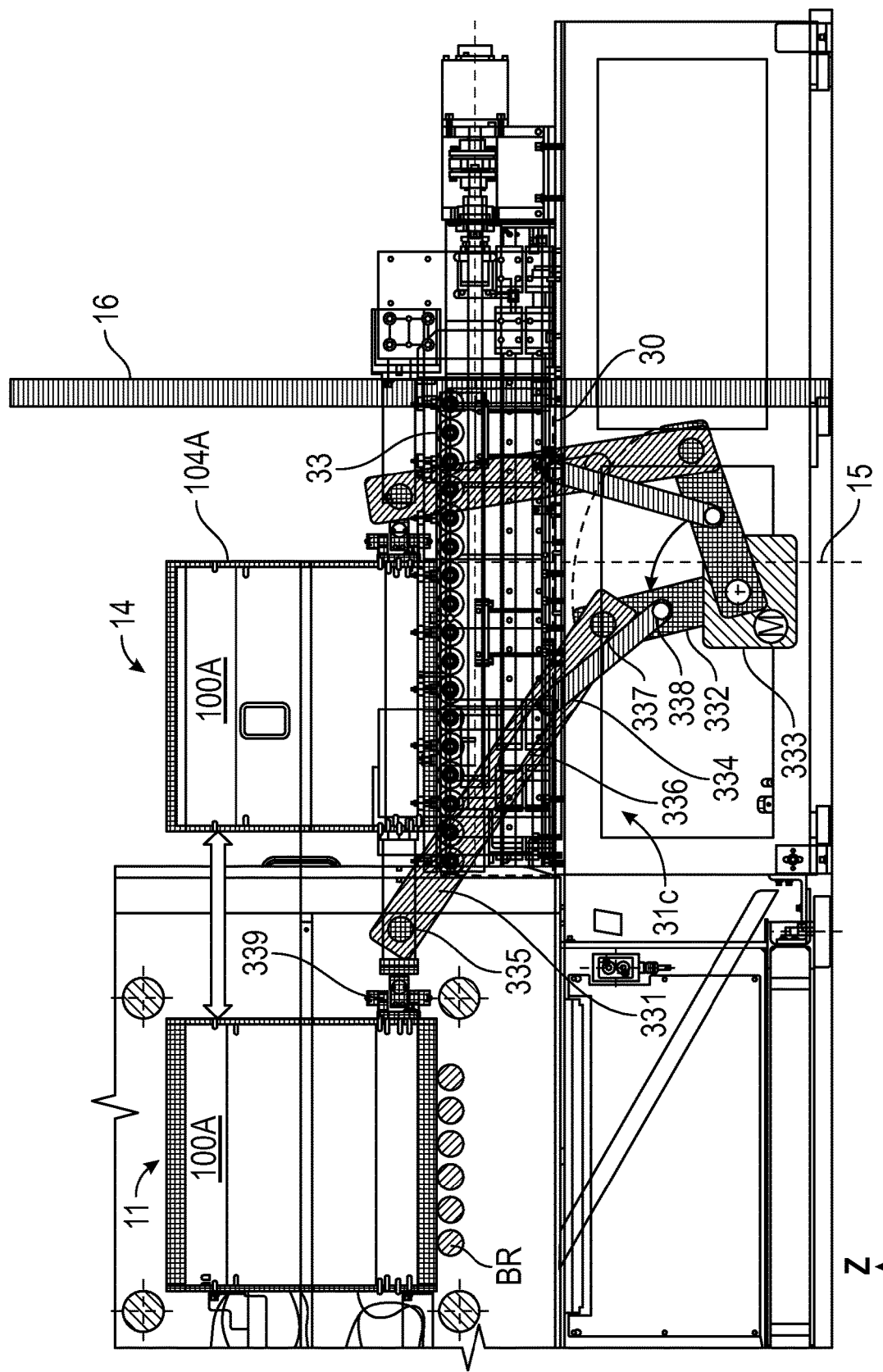
FIG. 8 illustrates a configuration of a conveyance unit 31c.

FIG. 8 illustrates a side view of a configuration of the conveyance unit 31c in a third modification. The conveyance unit 31c illustrated in FIG. 8 can be used in place of the conveyance unit 31 illustrated in FIGS. 5A and 5B.

The conveyance unit 31c in FIG. 8 includes a first linking member 331, a second linking member 332, a motor 333, e.g., actuator, and a lever 334. The linking block 339 is attached to the side surface 104A of the mold 100A, and the linking block 339 supports the shaft 335 that extends in the Y-axis direction.

The first linking member 331 is connected to the side surface 104A of the mold 100A via the shaft 335. The first linking member 331 is rotatable around the shaft 335. To manage vibration(s), etc., during conveyance, the first linking member 331 can be movable in parallel with the linking block 339 in the Y-axis direction together with the shaft 335. The first linking member 331 and the second linking member 332 are connected via the shaft 337 that extends in the Y-axis direction. The first linking member 331 and the second linking member 332 are mutually rotatable around the shaft 337.

The second linking member 332 rotates in the direction of the arrow upon receiving the driving force of the motor 333. The lever 334 is connected to the second linking member 332 via the shaft 338 that extends in the Y-axis direction. The lever 334 is rotatable around the shaft 338. A slotted hole 336 is formed in the first linking member 331, and a cam follower installed at the tip of the lever 334 is arranged so it engages with the slotted hole 326. The described configuration is the same as the relationship between the lever 303 and the slotted hole 308 illustrated in FIG. 5B. Except for the motor 333, the above-mentioned components can be collectively referred to as a linking unit. The cover 16 is installed to cover the mold 100A from the exterior. The mold 100A moves between the molding operation position 11 inside the injection molding machine 5 and the cooling position 14 that differs from the molding operation position 11 upon receipt of the actions of the first linking member 331, the second linking member 332, the motor 333 and the lever 334.

The rollers 33 contact the bottom surfaces of both ends in the Y-axis direction of the mold 100A to guide the movement of the mold 100A. The frame 30 to which the rollers 33 are attached forms the supporting surface of the mold 100A. The supporting surface of the mold 100A is the top surface of the frame 30. The motor 333 is positioned below this support surface in the Z-axis direction (vertical direction). A hole is formed in the central portion of the frame 30 in the Y-axis direction for the linking unit connecting the motor 333 and the side surface 104A of the mold 100A. The position of the side surface 104A where the mold 100A is at the cooling position 14 is indicated with the dotted line 15. The motor 333 is installed closer to the injection molding machine 5 than the dotted line 15 in the X-axis direction (direction of mold movement). A part of the motor 333 is located closer to the injection molding machine 5 than the dotted line 15 in FIG. 8, However, all the parts of the motor 333 can be located closer to the injection molding machine 5 than the dotted line 15.

The operation of the conveyance unit 31c will now be described. When the mold 100A is conveyed from the cooling position 14 toward the molding operation position 11, the motor 333 rotates in the counterclockwise direction as illustrated in in FIG. 8. The second linking member 332 that is connected to the motor 333 also rotates in the counterclockwise direction. Along with the rotational motion of the second linking member 332, the first linking member 331, which is connected to the second linking member 332, pushes out the mold 100A via the shaft 335. The lever 334 serves to guide the first linking member 331 so that the transmission of the driving force from the second linking member 332 to the first linking member 331 is performed smoothly. As a result, the mold 100A is moved from the cooling position 14 to the molding operation position 11. When the mold 100A is conveyed from the molding operation position 11 towards the cooling position 14, the motor 333 rotates in the clockwise direction as illustrated in FIG. 8. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc. is shortened, so the material cost for each component can also be reduced.

Figure 9:
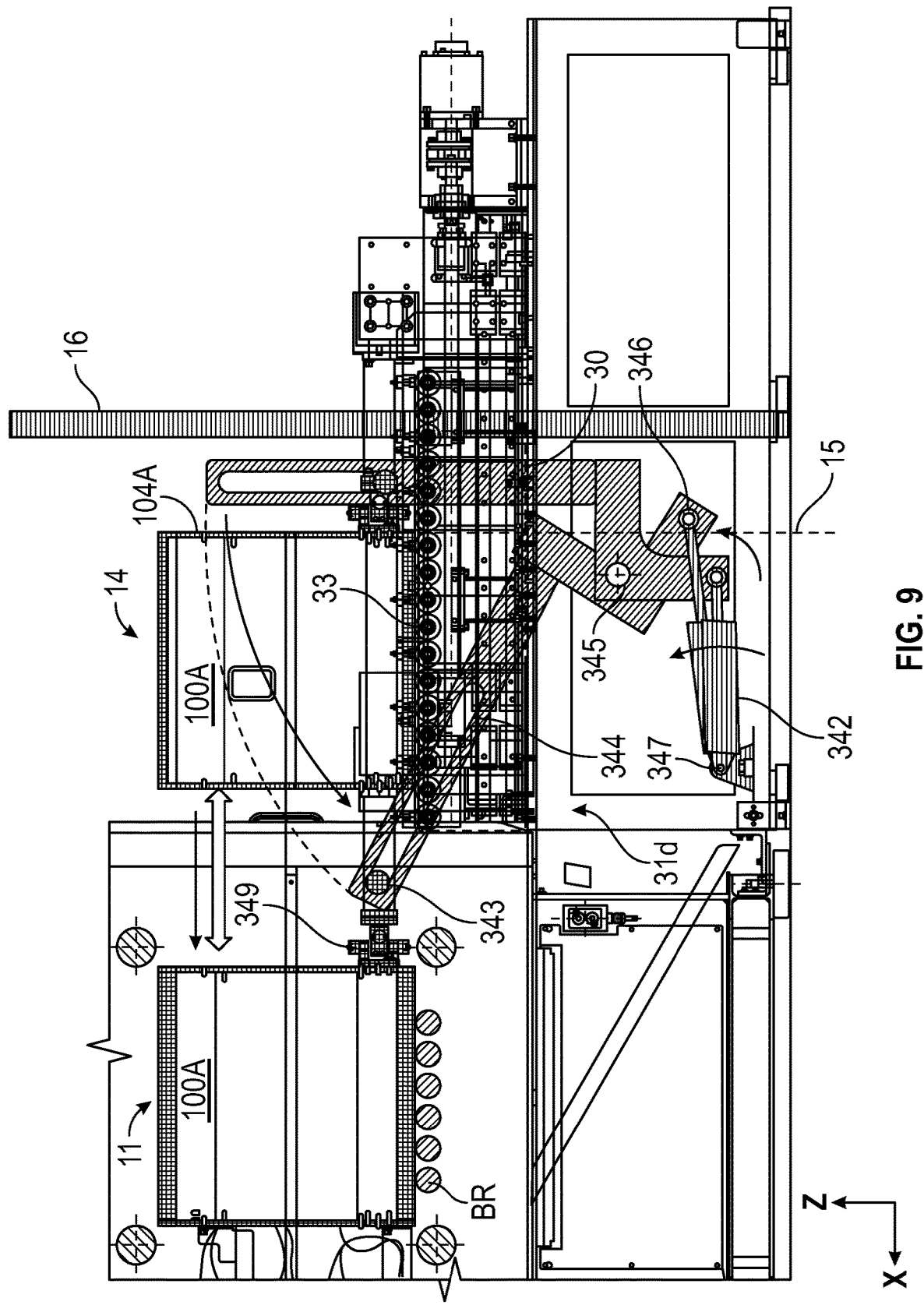
FIG. 9 illustrates a configuration of a conveyance unit 31d.

FIG. 9 illustrates a side view of a configuration of the conveyance unit 31d in a fourth modification. The conveyance unit 31d illustrated in FIG. 9 can be used in place of the conveyance unit 31 illustrated in FIGS. 5A and 5B.

The conveyance unit 31d in FIG. 9 includes a linking member 341 and an air cylinder 342, e.g., actuator. While the present embodiment includes an air cylinder 342, any type of cylinder, such as a hydraulic cylinder, can be used that enables practice of the present embodiment. A linking block 349 is attached to the side surface 104A of the mold 100A supports the shaft 343 extending in the Y-axis direction.

A slotted hole 344 is formed in the linking member 341, and the configuration is such that the shaft 343 engages with the slotted hole 344. In other words, the linking member 341 is connected to the side surface 104A of the mold 100A via the shaft 343. A cam follower can be installed at the tip of the lever instead of the shaft 343.

The air cylinder 342 is connected to the linking member 341 at the joining point 346, and rotates the linking member 341 in the direction of the arrow by expanding and contracting. In the present modification, the joining point 346 is installed on the side opposite to the side where the slotted hole 344 is formed via the shaft 345 which is the rotation center. In addition, the air cylinder 342 is rotatable around the shaft 347 that extends in the Y-axis direction. Except for the air cylinder 342, the above-mentioned components can be collectively referred to as a linking unit. The cover 16 is installed to cover the mold 100A from the exterior.

The mold 100A moves between the molding operation position 11 inside the injection molding machine 5 and the cooling position 14 that differs from the molding operation position 11 upon receipt of the actions of the linking member 341 and the air cylinder 342.

The rollers 33 contact the bottom surfaces of both ends of the mold 100A in the Y-axis direction to guide the movement of the mold 100A. The frame 30 to which the rollers 33 are attached forms a supporting surface of the mold 100A. The supporting surface of the mold 100A is the top surface of the frame 30. The air cylinder 342 is positioned below the support surface in the Z-axis direction (vertical direction). A hole is formed in the central portion of the frame 30 in the Y-axis direction for the linking unit connecting the air cylinder 342 and the side surface 104A of the mold 100A. The position of the side surface 104A where the mold 100A is at the cooling position 14 is indicated by the dotted line 15. The air cylinder 342 is installed closer to the injection molding machine 5 than the dotted line 15 in the X-axis direction (direction of mold movement). In FIG. 9, all portions of the air cylinder 342 are located closer to the injection molding machine 5 than the dotted line 15. However, at least a portion of the air cylinder 342 can be located closer to the injection molding machine 5 than the dotted line 15.

The operation of the conveyance unit 31d will now be described. When the mold 100A is conveyed from the cooling position 14 toward the molding operation position 11, the air cylinder 342 expands. As a result, the linking member 341 rotates counterclockwise, as illustrated in FIG. 9, around the shaft 345. Along with the rotational motion of the linking member 341, the shaft 343 moves along the slotted hole 344, and the mold 100A receives a driving force via the shaft 343. As a result, the mold 100A is moved from the cooling position 14 to the molding operation position 11. When the mold 100A is conveyed from the molding operation position 11 towards the cooling position 14, the air cylinder 342 is conversely contracted. As a result, the linking member 341 rotates clockwise, as illustrated in FIG. 9, around the shaft 345. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc. is shortened, so the material cost for each component can also be reduced.

Figure 10:
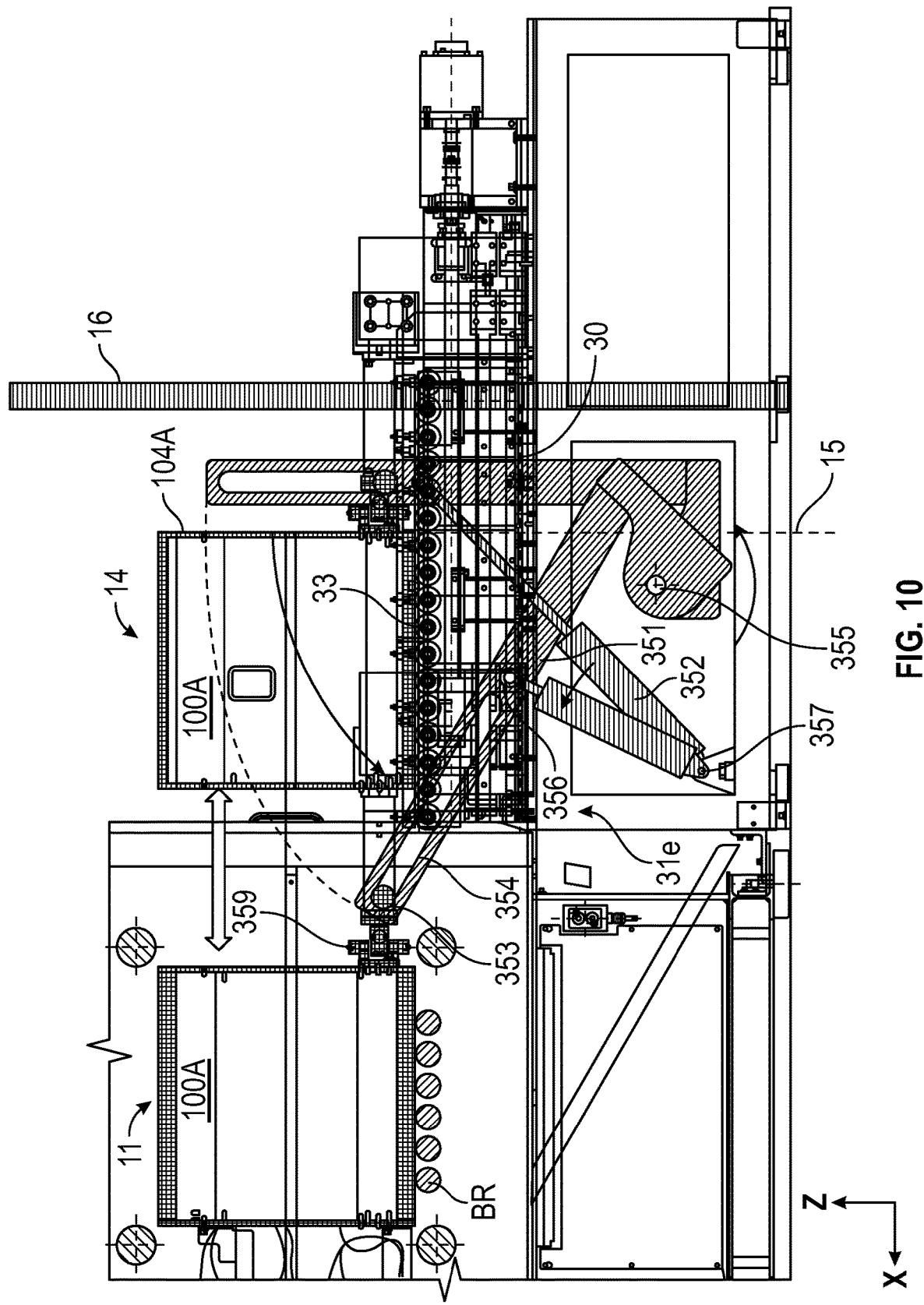
FIG. 10 illustrates a configuration of a conveyance unit 31e.

FIG. 10 illustrates a side view of a configuration of the conveyance unit 31e in a 5th modification. The conveyance unit 31e illustrated in FIG. 10 can be used in place of the conveyance unit 31 illustrated in FIGS. 5A and 5B.

The conveyance unit 31e in FIG. 10 includes a linking member 351 and an air cylinder 352, e.g., actuator. While the present embodiment includes an air cylinder 352, any type of cylinder, such as a hydraulic cylinder, can be used that enables practice of the present embodiment. The linking block 359 is attached to the side surface 104A of the mold 100A, and the linking block 359 supports the shaft 353 that extends in the Y-axis direction.

A slotted hole 354 is formed in the linking member 351, and it is arranged so the shaft 353 engages with the slotted hole 354. In other words, the linking member 351 is connected to the side surface 104A of the mold 100A via the shaft 353. A cam follower can be installed at the tip of the lever instead of the shaft 353.

The air cylinder 352 is connected to the linking member 351 at the joining point 356, and rotates the linking member 351 in the direction of the arrow by expanding and contracting. In the present modification, the joint point 356 is installed on the same side as the side where the slotted hole 354 is formed with the shaft 355 as the rotational center. This configuration is different from the configuration of FIG. 9. In addition, the air cylinder 352 is rotatable around the shaft 357 extending in the Y-axis direction. Except for the air cylinder 352, the above-mentioned components can be collectively referred to as a linking unit. The cover 16 is installed to cover the mold 100A from the exterior.

The mold 100A moves between the molding operation position 11 inside the injection molding machine 5 and the cooling position 14 that differs from the molding operation position 11 upon receipt of the actions of the linking member 351 and the air cylinder 352. The rollers 33 contact the bottom surfaces of both ends in the Y-axis direction of the mold 100A to guide the movement of the mold 100A. The frame 30 to which the rollers 33 are attached forms a supporting surface of the mold 100A. The supporting surface of the mold 100A is the top surface of the frame 30. The air cylinder 352 is positioned below the support surface in the Z-axis direction (vertical direction). A hole is formed in the central portion of the frame 30 in the Y-axis direction for the linking unit connecting the air cylinder 352 and the side surface 104A of the mold 100A. The position of the side surface 104A where the mold 100A is at the cooling position 14 is indicated with the dotted line 15. The air cylinder 352 is installed closer to the injection molding machine 5 than the dotted line 15 in the X-axis direction (direction of mold movement). All the positions of the air cylinder 352 are located closer to the injection molding machine 5 than the dotted line 15 in FIG. 10. However, at least a part of the air cylinder 352 can be located closer to the injection molding machine 5 than the dotted line 15.

The operation of the conveyance unit 31e will now be described. When the mold 100A is conveyed from the cooling position 14 toward the molding operation position 11, the air cylinder 352 contracts. This feature differs from the configuration of FIG. 9. As a result, the linking member 351 rotates counterclockwise as illustrated in FIG. 10 around the shaft 355. Along with the rotational motion of the linking member 351, the shaft 353 moves along the slotted hole 354, and the mold 100A receives a driving force via the shaft 353. As a result, the mold 100A is moved from the cooling position 14 to the molding operation position 11.

When the mold 100A is conveyed from the molding operation position 11 toward the cooling position 14, the air cylinder 352 conversely expands. As a result, the linking member 351 rotates clockwise as illustrated in FIG. 10 around the shaft 355. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc., is shortened, so the material cost for each component can also be reduced.

Figure 11:
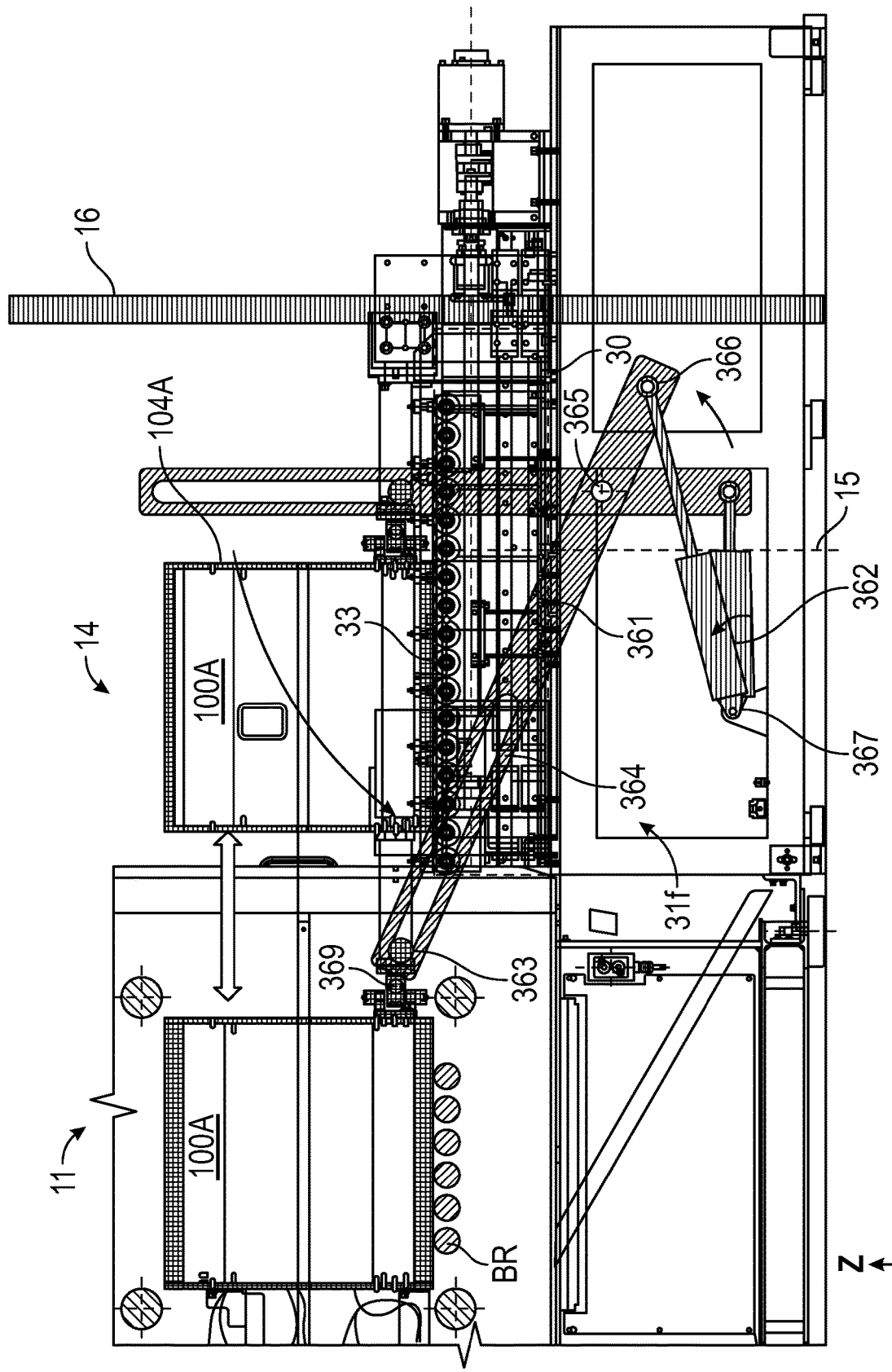
FIG. 11 illustrates a configuration of a conveyance unit 31f.

FIG. 11 illustrates a side view of a configuration of the conveyance unit 31f in a 6th modification. In other words, the conveyance unit 31f illustrated in FIG. 11 can be used in place of the conveyance unit 31 illustrated in FIG. 5.

The conveyance unit 31f in FIG. 11 includes a linking member 361 and an air cylinder 362, e.g., actuator. While the present embodiment includes an air cylinder 362, any type of cylinder, such as a hydraulic cylinder, can be used that enables practice of the present embodiment. The linking block 369 is attached to the side surface 104A of the mold 100A, and the linking block 369 supports the shaft 363 that extends in the Y-axis direction.

A slotted hole 364 is formed in the linking member 361, and it is arranged so the shaft 363 engages with the slotted hole 364. In other words, the linking member 361 is connected to the side surface 104A of the mold 100A via the shaft 363. A cam follower can be installed at the tip of the lever instead of the shaft 363. The air cylinder 362 is connected to the linking member 361 at the joining point 366, and rotates the linking member 361 in the direction of the arrow by expanding and contracting. In the present modification, the linking member 361 is a rod shaped member. This configuration is different from the configuration of FIG. 9. In addition, the air cylinder 362 is rotatable around the shaft 367 extending in the Y-axis direction. Except for the air cylinder 362, the above-described components can be collectively referred to as a linking unit. The cover 16 is installed to cover the mold 100A from the exterior.

The mold 100A moves between the molding operation position 11 inside the injection molding machine 5 and the cooling position 14 that differs from the molding operation position 11 upon receipt of the actions of the linking member 361 and the air cylinder 362. The rollers 33 contact the bottom surfaces of both ends in the Y-axis direction of the mold 100A to guide the movement of the mold 100A. The frame 30 to which the rollers 33 are attached forms a supporting surface of the mold 100A. The supporting surface of the mold 100A is the top surface of the frame 30. The air cylinder 362 is positioned below the support surface in the Z-axis direction (vertical direction). A hole is formed in the central portion of the frame 30 in the Y-axis direction for the linking unit connecting the air cylinder 362 and the side surface 104A of the mold 100A. The position of the side surface 104A in the condition where the mold 100A is at the cooling position 14 is indicated with the dotted line 15. The air cylinder 362 is located closer to the injection molding machine 5 than the dotted line 15 in the X-axis direction (direction of mold movement). All the positions of the air cylinder 362 are located closer to the injection molding machine 5 than the dotted line 15 in FIG. 11 However, at least a part of the air cylinder 362 can be located closer to the injection molding machine 5 than the dotted line 15.

The operation of the conveyance unit 31f will now be described. When the mold 100A is conveyed from the cooling position 14 toward the molding operation position 11, the air cylinder 362 expands. As a result, the linking member 361 rotates counterclockwise as illustrated in FIG. 11 around the shaft 365. Along with the rotational motion of the linking member 361, the shaft 363 moves along the slotted hole 364, and the mold 100A receives a driving force via the shaft 363. As a result, the mold 100A is moved from the cooling position 14 to the molding operation position 11.

When the mold 100A is conveyed from the molding operation position 11 toward the cooling position 14, the air cylinder 362 is conversely contracted. As a result, the linking member 361 rotates clockwise as illustrated in FIG. 11 around the shaft 365. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc., is shortened, so the material cost for each component can also be reduced.

Figure 12:
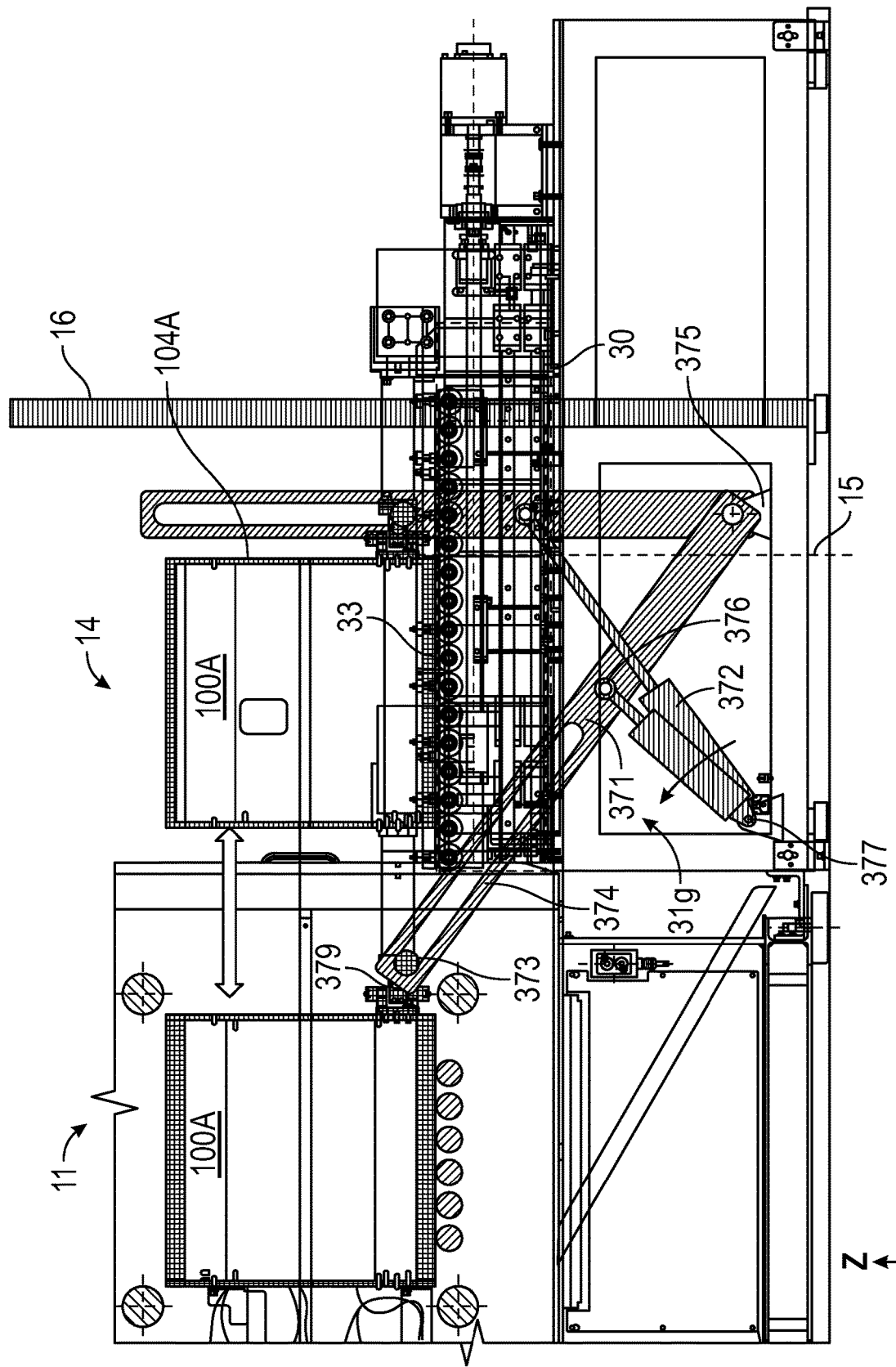
FIG. 12 illustrates a configuration of a conveyance unit 31g.

FIG. 12 illustrates a side view of a configuration of the conveyance unit 31g in a 7th modification. In other words, the conveyance unit 31g illustrated in FIG. 12 can be used in place of the conveyance unit 31 illustrated in FIG. 5.

The conveyance unit 31g in FIG. 12 includes a linking member 371 and an air cylinder 372, e.g., actuator. While the present embodiment includes an air cylinder 362, any type of cylinder, such as a hydraulic cylinder, can be used that enables practice of the present embodiment. The linking block 379 is attached to the side surface 104A of the mold 100A, and the linking block 379 supports the shaft 373 that extends in the Y-axis direction.

A slotted hole 374 is formed in the linking member 371, and it is arranged so the shaft 373 engages with the slotted hole 374. In other words, the linking member 371 is connected to the side surface 104A of the mold 100A via the shaft 373. A cam follower can be installed at the tip of the lever instead of the shaft 373. The air cylinder 372 is connected to the linking member 371 at the joining point 376, and rotates the linking member 371 in the direction of the arrow by expanding and contracting. In the present modification, the linking member 371 is a rod shaped member. This configuration is different from the configuration of FIG. 10. In addition, the air cylinder 372 is rotatable around the shaft 377 extending in the Y-axis direction. Except for the air cylinder 372, the above-described components can be collectively referred to as a linking unit. The cover 16 is installed to cover the mold 100A from the exterior.

The mold 100A moves between the molding operation position 11 inside the injection molding machine 5 and the cooling position 14 that differs from the molding operation position 11 upon receipt of the actions of the linking member 371 and the air cylinder 372. The rollers 33 contact the bottom surfaces of both ends in the Y-axis direction of the mold 100A to guide the movement of the mold 100A. The frame 30 to which the rollers 33 are attached forms a supporting surface of the mold 100A. The supporting surface of the mold 100A is the top surface of the frame 30. The air cylinder 372 is positioned below the support surface in the Z-axis direction (vertical direction). A hole is formed in the central portion of the frame 30 in the Y-axis direction for the linking unit connecting the air cylinder 372 and the side surface 104A of the mold 100A. The position of the side surface 104A where the mold 100A is at the cooling position 14 is indicated with the dotted line 15. The air cylinder 372 is installed closer to the injection molding machine 5 than the dotted line 15 in the X-axis direction (direction of mold movement). All the positions of the air cylinder 372 are located closer to the injection molding machine 5 than the dotted line 15 in FIG. 12. However, at least a part of the air cylinder 372 can be located closer to the injection molding machine 5 than the dotted line 15.

The operation of the conveyance unit 31g will now be described. When the mold 100A is conveyed from the cooling position 14 toward the molding operation position 11, the air cylinder 372 contracts. As a result, the linking member 371 rotates counterclockwise as illustrated in FIG. 12 around the shaft 375. Along with the rotational motion of the linking member 361, the shaft 363 moves along the slotted hole 364, and the mold 100A receives a driving force via the shaft 363. As a result, the mold 100A is moved from the cooling position 14 to the molding operation position 11.

When the mold 100A is conveyed from the molding operation position 11 toward the cooling position 14, the air cylinder 362 is conversely expanded. As a result, the linking member 361 rotates clockwise as illustrated in FIG. 12 around the shaft 365. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc., is shortened, so the material cost for each component can also be reduced.

Figure 13:
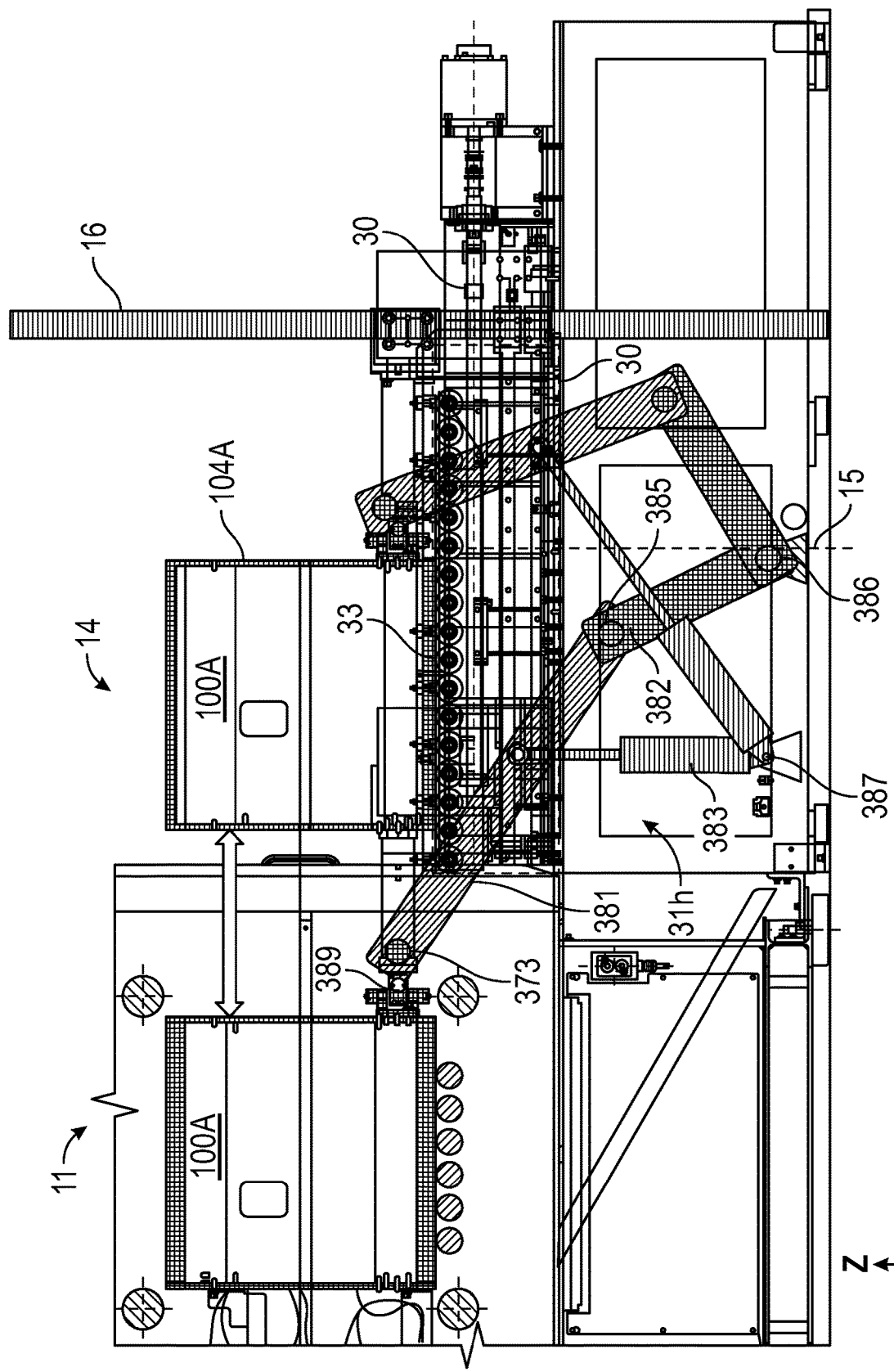
FIG. 13 illustrates a configuration of a conveyance unit 31h.

FIG. 13 illustrates a side view of a configuration of the conveyance unit 31h in the seventh modification. In other words, the conveyance unit 31h illustrated in FIG. 13 can be used in place of the conveyance unit 31 illustrated in FIG. 5.

The conveyance unit 31h in FIG. 13 includes a first linking member 381, a second linking member 382, and an air cylinder 383, e.g., actuator. While the present embodiment includes an air cylinder 342, any type of cylinder, such as a hydraulic cylinder, can be used that enables practice of the present embodiment. The linking block 389 is attached to the side surface 104A of the mold 100A, and the linking block 389 supports the shaft 384 that extends in the Y-axis direction.

The first linking member 381 is connected to the side surface 104A of the mold 100A via the shaft 384. The first linking member 381 is rotatable around the shaft 384. The first linking member 381 and the second linking member 382 are connected via the shaft 385 that extends in the Y-axis direction.

The first linking member 381 and the second linking member 382 are mutually rotatable around the shaft 385. The second linking member 382 is rotatable around the shaft 386 extending in the Y-axis direction. The air cylinder 383 is connected to the first linking member 381 at the joining point 388, and rotates the first linking member 381 and the second linking member 382 by expanding and contracting. The air cylinder 382 is rotatable around the shaft 387 that extends in the Y-axis direction. Except for the air cylinder 383, the above-described components can be collectively referred to as a linking unit. The cover 16 is installed to cover the mold 100A from the exterior.

The mold 100A moves between the molding operation position 11 inside the injection molding machine 5 and the cooling position 14 outside the injection molding machine 5 upon receipt of the actions of the first linking member 381, the second linking member 382, and the air cylinder 383. The rollers 33 contact the bottom surfaces of both ends in the Y-axis direction of the mold 100A to guide the movement of the mold 100A. The frame 30 to which the rollers 33 are attached forms the supporting surface of the mold 100A. The supporting surface of the mold 100A is the top surface of the frame 30. The air cylinder 383 is positioned below the support surface in the Z-axis direction (vertical direction).

A hole is formed in the central portion of the frame 30 in the Y-axis direction for the linking unit connecting the air cylinder 342 and the side surface 104A of the mold 100A. The position of the side surface 104A where the mold 100A is at the cooling position 14 is indicated by a dotted line 15. The air cylinder 383 is installed closer to the injection molding machine 5 than the dotted line 15 in the X-axis direction (direction of mold movement). While all the positions of the air cylinder 383 are installed closer to the injection molding machine 5 than the dotted line 15 illustrated in in FIG. 13, at least a part of the air cylinder 383 can be installed closer to the injection molding machine 5 than the dotted line 15.

The operation of the conveyance unit 31h will now be described. When the mold 100A is conveyed from the cooling position 14 toward the molding operation position 11, the air cylinder 383 is contracted. As a result, the first linking member 381 rotates in a counterclockwise direction as illustrated in FIG. 13 around the shaft 385, and the second linking member 382 rotates counterclockwise as illustrated in FIG. 13 around the shaft 386. Along with the rotational motion of the first linking member 381 and the second linking member 382, the first linking member 381 pushes out the mold 100A via the shaft 384. As a result, the mold 100A is moved from the cooling position 14 to the molding operation position 11.

When the mold 100A is conveyed from the molding operation position 11 toward the cooling position 14, the air cylinder 383 reversely expands. As a result, the linking member 381 rotates clockwise as illustrated in FIG. 13 around the shaft 385, and the second linking member 382 rotates clockwise as illustrated in FIG. 13 around the shaft 386. Another component operates in a direction opposite to the above-described direction, and the mold 100A is moved from the molding operation position 11 to the cooling position 14.

Using the above-described configuration enables downsizing the injection molding system in the X-axis direction compared with a conventional injection molding system. In addition, the length of the frame 30, etc., is shortened, so the material cost for each component can also be reduced.

Figure 14:
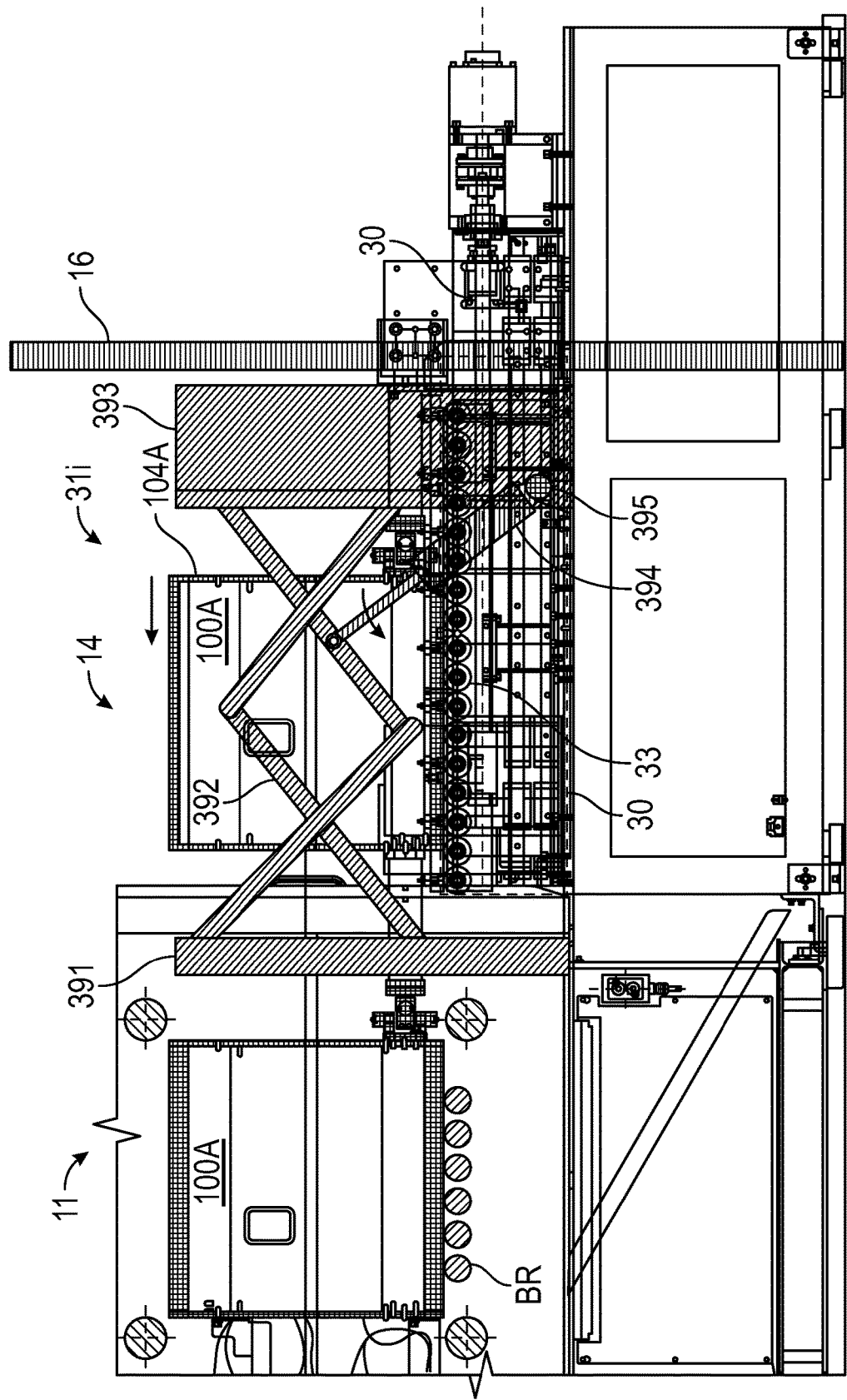
FIG. 14 illustrates a configuration of a conveyance unit 31i.

FIG. 14 illustrates a side view of a configuration of the conveyance unit 31i in an 8th modification. In other words, the conveyance unit 31i illustrated in FIG. 14 can be used instead of the conveyance unit 31 illustrated in FIG. 5.

The conveyance unit 31i in FIG. 14 includes a linking member 391, an expansion/contraction arm 392, a supporting member 393, and an air cylinder 394, e.g., actuator. While the present embodiment includes an air cylinder 342, any type of cylinder, such as a hydraulic cylinder, can be used that enables practice of the present embodiment. The linking member 391 is connected to the side surface 104A of the mold 100A.

An expandable arm 392 expandable in the X-axis direction is installed between the linking member 391 and the supporting member 393. The supporting member 393 is fixed with respect to the frame 30. The air cylinder 394 is attached to the expandable arm 392, and the expandable arm 392 can be expanded and contracted by expanding and contracting the air cylinder 394. The air cylinder 394 is rotatable around the shaft 395 that extends in the Y-axis direction. Except for the air cylinder 394, the above-mentioned components can be collectively referred to as a linking unit. The cover 16 is installed to cover the mold 100A from the exterior.

The mold 100A moves between the molding operation position 11 inside the injection molding machine 5 and the cooling position 14 outside the injection molding machine 5 upon receipt of the actions of the linking member 391, the expandable arm 392, the supporting member 393 and the air cylinder 394. The rollers 33 contact the bottom surface of the mold 100A to guide the movement of the mold 100A. The frame 30 to which the rollers 33 are attached forms the supporting surface of the mold 100A. A part of the air cylinder 394 is positioned below the support surface in the Z-axis direction (vertical direction).

The operation of the conveyance unit 31$i$ will now be described. When the mold 100A is conveyed from the cooling position 14 toward the molding operation position 11, the air cylinder 394 expands. As a result, the expandable arm 392 expands, and the linking member 391 moves in the X-axis direction to push out the mold 100A. As a result, the mold 100A is moved from the cooling position 14 to the molding operation position 11.

When the mold 100A is conveyed from the molding operation position 11 toward the cooling position 14, the air cylinder 394 is conversely contracted. As a result, the expandable arm 392 retracts, and the linking member 391 moves in the X-axis direction to pull back the mold 100A. As a result, the mold 100A is moved from the molding operation position 11 to the cooling position 14.

Using the above-described configuration enables downsizing the injection molding system in the X-axis direction compared with a conventional injection molding system. In addition, the length of the frame 30, etc., is shortened, so the material cost for each component can also be reduced.

Cooling pipes and thermocouples are installed inside the mold 100A. A plurality of cables are connected to the mold 100A to supply cooling water and electric power to the mold 100A. These cables move with the mold 100A as the mold 100A is moved in/out of the injection molding machine 5, which provides for a cable layout that does not hinder the movement of the mold 100A. FIGS. 15A-17C illustrate improvements in the cable layout, and any reference to known components are provided for description purposes only.

Figure 15A:
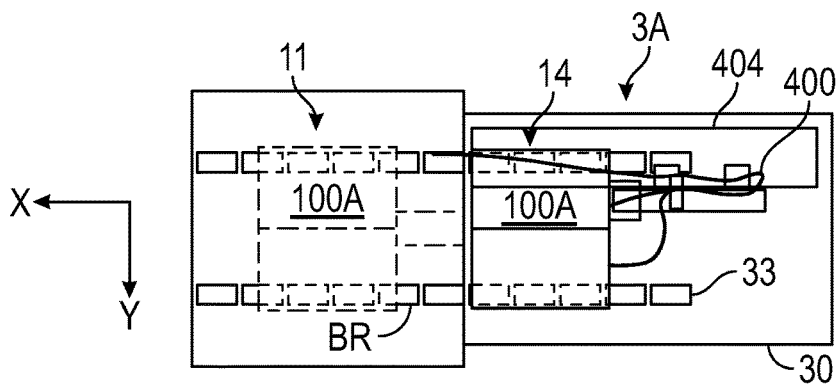
FIGS. 15A, 15B, and 15C illustrate a cable layout.
Figure 15B:
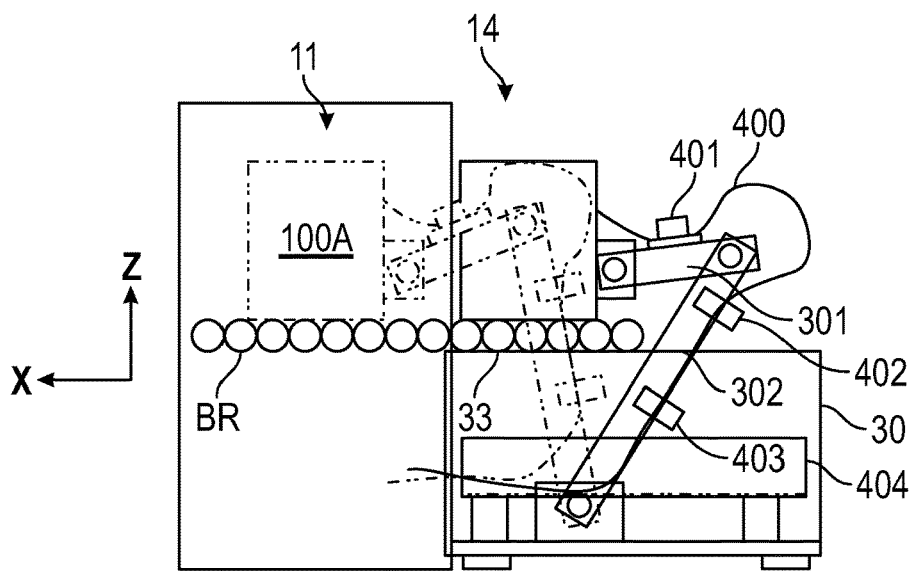
Figure 15C:
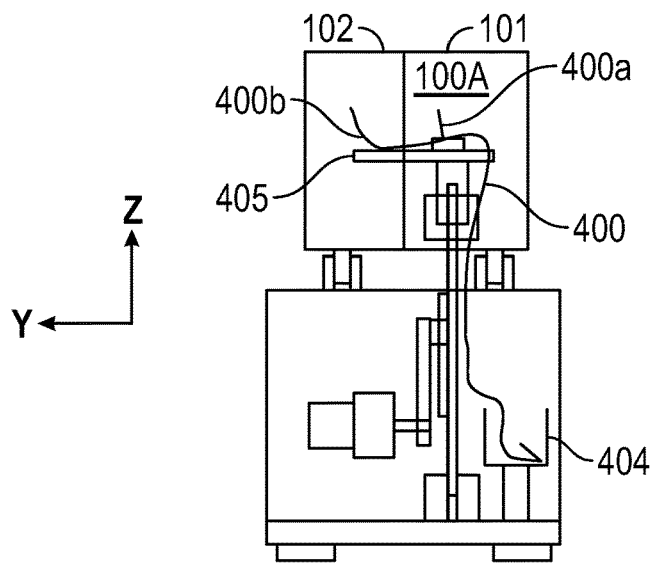

FIGS. 15A, 15B, and 15C illustrates a configuration of the cable layout in the present embodiment. FIG. 15A is a top view, FIG. 15B is a side view, and FIG. 15C is a front view. The following description will be provided using the conveyance unit 31 illustrated in FIG. 5. Some components, such as the motor 304, of the conveyance unit 31 are omitted from FIG. 15.

In FIG. 15A, the conveying machine 3A includes a receptacle 404 for a cable 400 connected to the mold 100A. As illustrated in FIG. 15B, the cable 400 is secured by a plurality of cable clamps 401, 402, and 403 until it reaches the receptacle 404 from the mold 100A. The cable clamp 401 fixes the cable 400 to the first linking member 301. The cable clamps 402 and 403 secure the cable 400 to the second linking member 302.

The cable 400 then reaches the receptacle 404, is guided in the X-axis direction, and is connected to a cooling water pump and a temperature control controller (not illustrated) installed in the lower portion of the injection molding machine 5. Since the cable 400 is secured to the first linking member 301 and the second linking member 302, it does not become an obstruction when the mold 100A is moved between the molding operation position 11 and the cooling position 14. Thus, it is possible to prevent a situation where the cable 400 is damaged as a result of interference between the mold 100A and the cable 400.

As illustrated in FIG. 15C, the cable 400 branches into a cable 400$a$ that is connected to the fixed mold 101 and a cable 400$b$ that is connected to the movable mold 102. The first linking member 301 is provided with a guide plate 405 to guide the cable 400$b$ in the Y-axis direction. When removing the molded product from the mold 100A, the movable mold 102 moves in the Y-axis direction, making it necessary to guide the cable 400$b$ in the Y-axis direction. The guide plate 405 also prevents the cable 400$b$ from dropping in the Z-axis direction and interfering with other components. For example, when the mold 100A is moved, the cable 400$b$ is prevented from interfering with components such as the first linking member 301 and the second linking member 302, getting caught between the mold 100A and the rollers 33, or getting caught in the mold 100A when the mold 100A is opened and closed. The presence of the guide plate 405 prevents the cable 400$b$ from becoming an obstruction when the mold 100A is opened and closed.

Figure 16A:
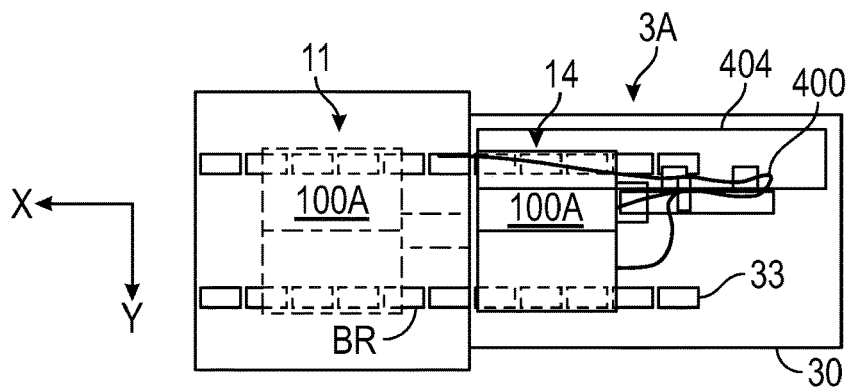
FIGS. 16A, 16B, and 16C illustrate a cable layout.
Figure 16B:
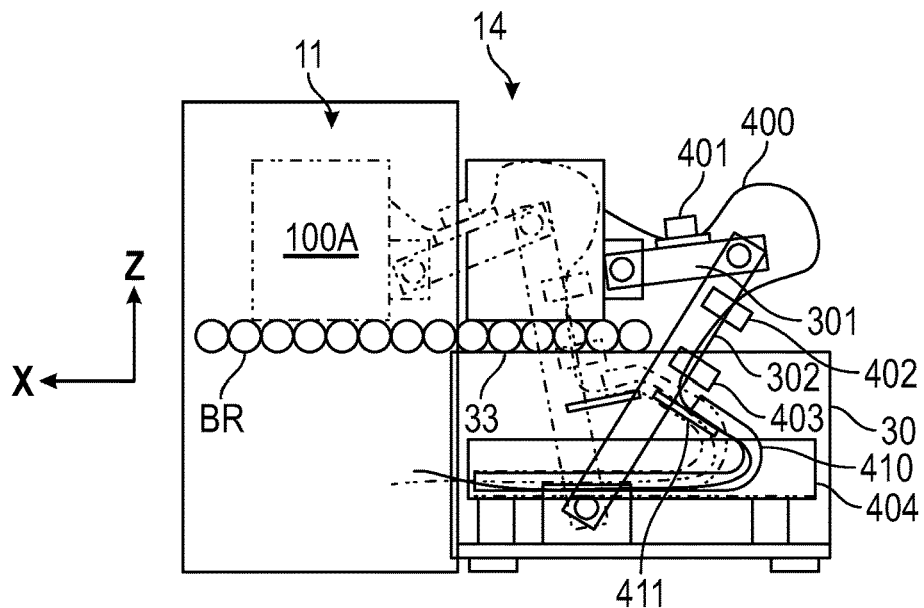
Figure 16C:
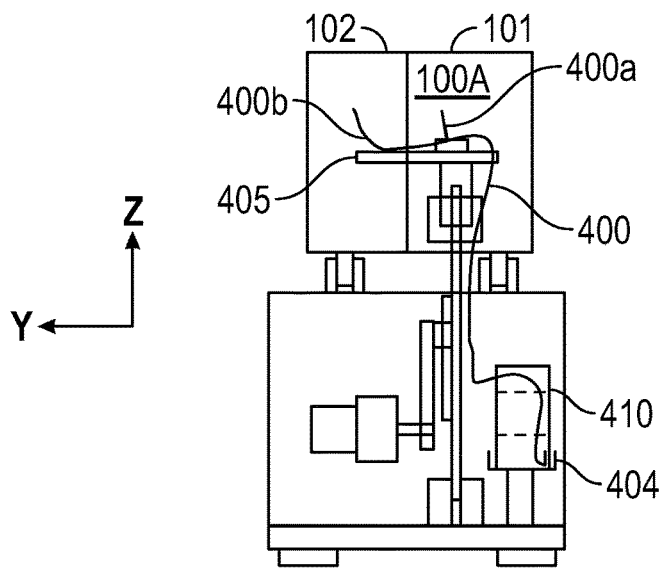

FIGS. 16A, 16B, and 16C illustrate a configuration of the cable layout in a first modification. FIG. 16A is a top view, FIG. 16B is a side view, and FIG. 16C is a front view. FIGS. 16A, 16B, and 16C are similar to FIGS. 15A, 15B, and 15C, and as such, descriptions related to the same parts are omitted herein, and only the parts that are different will be described.

In the cable layout in this modification, a cable carrier 410 is added. The cable carrier 410, e.g., an e-chain, is a chain-like member for protecting the cable 400 from the outside and for regulating (guiding) the movement of the cable 400. In FIG. 16B, the second linking member 302 is provided with a mounting plate 411 for mounting one end of the cable carrier 410 in addition to the cable clamps 402 and 403. One end of the cable carrier 410 is fixed to the mounting plate 411 and reaches the receptacle 404 while protecting the cable 400 from the outside. The other end of the cable carrier 410 is fixed to the receptacle 404. Since the position where the cable 400 reaches the receptacle 404 is where the cable 400 bends and changes its shape the most, the cable 400 can easily wear out. Early damage of the cable 400 can be prevented by protecting this portion with the cable carrier 410.

Figure 17A:
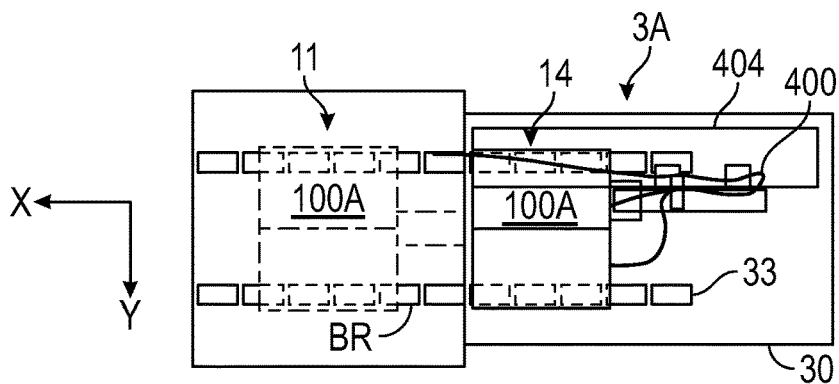
FIGS. 17A, 17B, and 17C illustrate a cable layout.
Figure 17B:
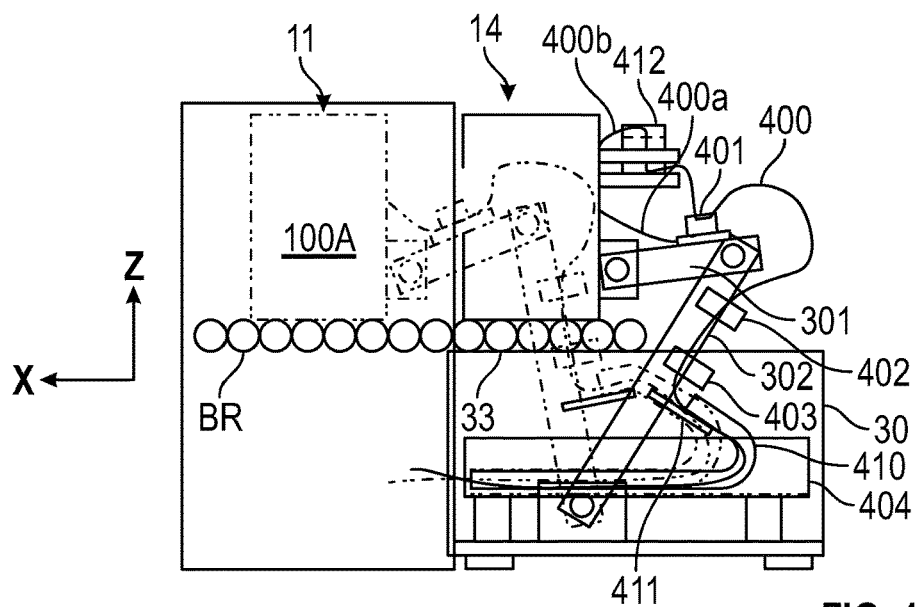
Figure 17C:
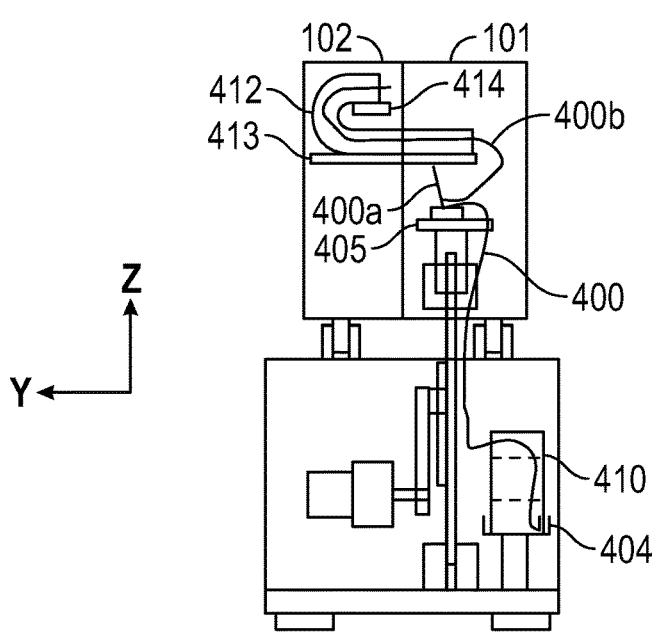

FIGS. 17A, 17B, and 17C illustrate a configuration of the cable layout in a second modification. FIG. 17A is a top view, FIG. 17B is a side view, and FIG. 17C is a front view. FIGS. 17A, 17B, and 17C are similar to FIGS. 16A, 16B, and 16C, and as such, descriptions related to the same parts are omitted herein, and only the parts that are different will be described.

In the cable layout in this modification, a cable carrier 412 is added. The cable carrier 412, e.g., an e-chain, is a chain-like member for protecting the cable 400 from the outside and for regulating (guiding) the movement of the cable 400. In FIG. 17B, the fixed mold 101 is provided with a mounting plate 413 for mounting one end of the cable carrier 412. The movable mold 102 is provided with a mounting plate 414 for mounting the other end of the cable carrier 412. In other words, one end of the cable carrier 412 is fixed to the mounting plate 413 and the other end of the cable carrier 412 is fixed to the mounting plate 414. The cable carrier 412 protects the cable 400$b$ which is connected to the movable mold 102. Since the cable 400$b$ frequently moves in the Y-axis direction based on the opening and closing motions of the mold 100A, the cable 400$b$ can easily wear out. Early damage of the cable 400$b$ can be prevented by protecting this portion with the cable carrier 412.

As previously indicated, the above discussion is provided with respect to the mold A for description purposes. As such, the configurations illustrated in FIGS. 5A-14 can be adopted for the conveyance unit 31 installed in the conveying machine 3B. One of the cable layouts illustrated in FIGS. 15A-17C can be adopted in the conveyance unit 31 installed in the conveying machine 3B.

Figure 18:
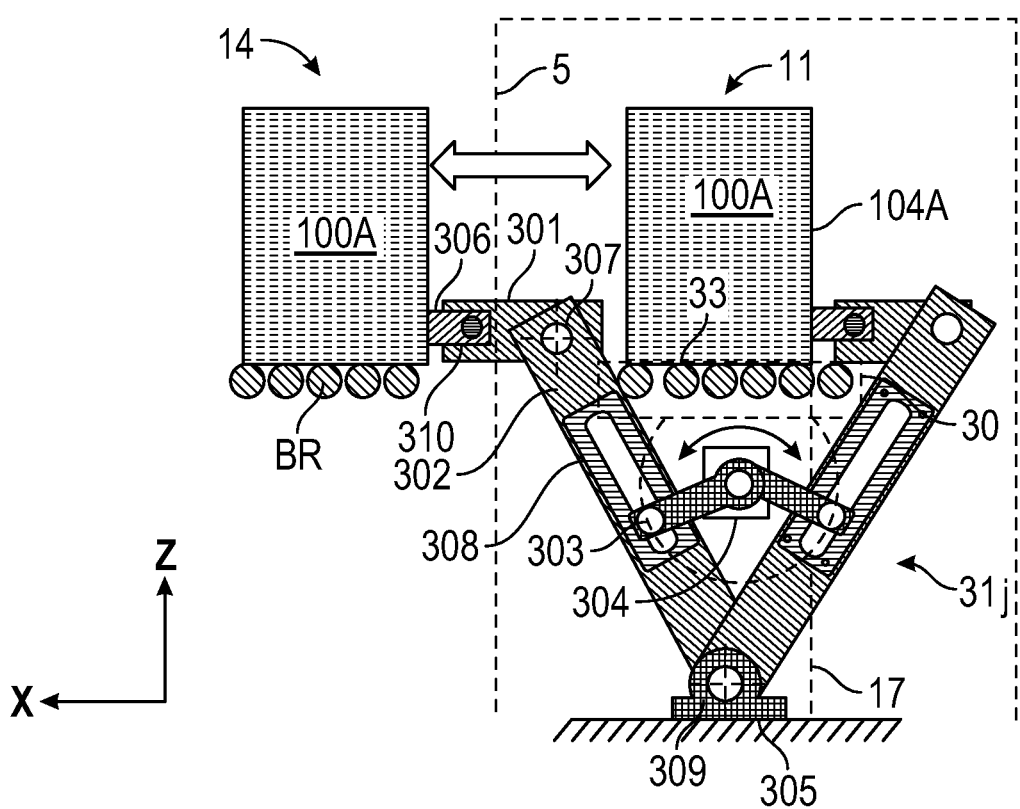
FIG. 18 illustrates a configuration of conveyance unit 31.

FIG. 18 illustrates an exemplary embodiment where conveyance unit 31*j* is located inside the injection molding machine 5. The structure of conveyance unit 31*j* is identical to the structure of conveyance unit 31 illustrated in FIG. 5A. As such, a detailed explanation of the structure of conveyance unit 31*j* is omitted herein.

Dotted line 17 represents the position of the side surface 104A when mold 100A is at the molding operating position 11.

In additional exemplary embodiments, a section of each of the conveyance units 31*b*-31*i* can respectively be located inside the injection molding machine 5.

In another exemplary embodiment, to convey mold 100B in addition to mold 100A, the injection molding machine 5 can include two conveyance units 31 inside the injection molding machine 5. In still yet another exemplary embodiment, mold 100A and mold 100B are connected by a connection unit (not illustrated), which enables a single conveyance unit 31 to move both mold 100A and 100B.

The above-described configuration was explained based on a premise that two molds are used in the injection molding system 1, but is not limited to this. The above-described configuration can be applied to an injection molding system that uses one mold.

What is claimed is:

1. A conveyance apparatus for conveying a mold into an injection molding machine, the conveyance apparatus comprising:
   a frame forming a supporting plane for supporting the mold;
   an actuator configured to move the mold along the supporting plane between a first position inside the injection molding machine and a second position different from the first position; and
   a linking unit, wherein:
      the actuator is installed below the supporting plane in a vertical direction,
      the linking unit is configured to link the mold with the actuator to provide said movement,
      the linking unit is connectable to a side surface of the mold, and
      in a state where the linking unit is connected to the side surface of the mold with the mold arranged at the second position, at least a part of the actuator is closer to the injection molding machine than the side surface of the mold in a conveying direction of the mold between the first and second positions.

2. The conveyance apparatus according to claim 1, wherein the linking unit includes at least one linking member configured to transmit a driving force of the actuator to the mold.

3. The conveyance apparatus according to claim 2, wherein the at least one linking member is configured to move in a direction orthogonal to the conveying direction based on vibrations during said movement of the mold.

4. The conveyance apparatus according to claim 1, wherein:
   the linking unit includes a first linking member and a second linking member,
   the first linking member is configured to rotate based on a driving force of the actuator, and
   the second linking member is connected to the first linking member and is configured to rotate based on rotation of the first linking member.

5. The conveyance apparatus according to claim 1, wherein:
   the linking unit includes a first linking member and a second linking member,
   the first linking member includes a slotted hole and is configured to rotate based on a driving force of the actuator and the second linking member includes a protruding portion that engages with the slotted hole, and
   the protruding portion is configured to slide along the slotted hole while the driving force is transmitted from the first linking member to the second linking member.

6. The conveyance apparatus according to claim 1, wherein:
   the linking unit includes a first linking member and a second linking member, and
   the first linking member moves along the conveying direction of the mold based on a driving force of the actuator received via the second linking member.

7. The conveyance apparatus according to claim 1, wherein the actuator includes a cylinder, and at least one linking member of the linking unit is configured to rotate based on an expansion of the cylinder such that the mold moves from the second position to the first position.

8. The conveyance apparatus according to claim 1. wherein the actuator includes a cylinder, and at least one linking member of the linking unit is configured to rotate based on a contraction of the cylinder such that the mold moves from the second position to the first position.

9. A conveyance apparatus for conveying a mold into an injection molding machine, the conveyance apparatus comprising:
   a frame forming a supporting plane for supporting the mold;
   an actuator configured to move the mold along the supporting plane; and
   a linking unit, wherein:
      the actuator is installed below the supporting plane in a vertical direction,
      the linking unit is configured to link the mold with the actuator to provide said movement,
      the linking unit is connectable to a side surface of the mold, and
      the linking unit includes a first linking member configured to rotate by a driving force of the actuator, and a second linking member that is connected to the first linking member and configured to rotate with rotation of the first linking member.

10. A conveyance apparatus for conveying a mold into an injection molding machine, the conveyance apparatus comprising:
   a frame forming a supporting plane for supporting the mold;
   an actuator configured to move the mold along the supporting plane; and
   a linking unit, wherein:
      the actuator is installed below the supporting plane in a vertical direction,
      the linking unit is configured to link the mold with the actuator to provide said movement,
      the linking unit is connectable to a side surface of the mold,
      the linking unit includes a first linking member in which a slotted hole is formed and configured to rotate by a driving force of the actuator, and a second linking member that includes a protruding portion that engages with the slotted hole, and the protruding portion is configured to slide along the slotted hole while the driving force is transmitted from the first linking member to the second linking member.

11. An injection molding system comprising:

an injection molding apparatus configured to perform injection molding with a mold; and a conveying apparatus configured to convey the mold, wherein the conveying apparatus comprises:

a frame forming a supporting plane for supporting the mold;

an actuator configured to move the mold along the supporting plane between a first position inside the injection molding machine and a second position different from the first position; and a linking unit, wherein:

the actuator is installed below the supporting plane in a vertical direction, the linking unit is configured to link the mold with the actuator to provide said movement, the linking unit is connectable to a side surface of the mold, and in a state where the linking unit is connected to the side surface of the mold with the mold arranged at the second position, at least a part of the actuator is closer to the injection molding machine than the side surface of the mold in a conveying direction of the mold between the first and second positions.

12. The injection molding system according to claim 11, wherein the linking unit includes at least one linking member configured to transmit a driving force of the actuator to the mold.

13. The injection molding system according to claim 12, wherein the at least one linking member is configured to move in a direction orthogonal to the conveying direction based on vibrations during said movement of the mold.

14. The injection molding system according to claim 11, wherein:

the linking unit includes a first linking member and a second linking member, the first linking member is configured to rotate based on a driving force of the actuator, and the second linking member is connected to the first linking member and is configured to rotate based on rotation of the first linking member.

15. The injection molding system according to claim 11, wherein:

the linking unit includes a first linking member and a second linking member, the first linking member includes a slotted hole and is configured to rotate based on a driving force of the actuator and the second linking member includes a protruding portion that engages with the slotted hole, and the protruding portion is configured to slide along the slotted hole while the driving force is transmitted from the first linking member to the second linking member.

16. A manufacturing method for manufacturing a molded part using the injection molding system according to claim 11, the method comprising:

moving the mold from the second position to the first position, and injecting a resin to the mold at the first position, wherein, in a state where the mold is at the first position, the mold is closer to the injection molding machine than the actuator in the conveying direction.

* * * * *